United States Patent [19]

Hirasaka et al.

[11] Patent Number: 4,893,402
[45] Date of Patent: Jan. 16, 1990

[54] SYSTEM FOR ASSEMBLING BOTTOM PARTS FOR VEHICLES

[75] Inventors: Mitsuaki Hirasaka; Kunio Nokajima; Nagatoshi Murata, all of Sayama, Japan

[73] Assignee: Honda Giken Kogyo Kabushiki Kaisha, Tokyo, Japan

[21] Appl. No.: 230,082

[22] Filed: Aug. 9, 1988

[30] Foreign Application Priority Data

Oct. 8, 1987 [JP] Japan .................. 62-198343

[51] Int. Cl.$^4$ ............................. B21B 39/14
[52] U.S. Cl. ...................... 29/771; 29/784; 29/822
[58] Field of Search ........... 29/430, 431, 771, 784, 29/822–824

[56] References Cited

U.S. PATENT DOCUMENTS 4,693,358 9/1987 Kondo et al. .................. 29/824

Primary Examiner—Timothy V. Eley
Attorney, Agent, or Firm—Armstrong, Nikaido, Marmelstein, Kubovcik & Murray

[57] ABSTRACT

A system for assembling bottom parts for vehicles, in which the bottom parts are transported to a position below a vehicle body positioned and fixed and are assembled to the vehicle body. The system includes a transporter for circulating a pallet member holding thereon bottom parts and a plurality of threaded parts for fastening the bottom parts to the vehicle body, so that the pallet member is stopped below the vehicle body. A first feeder is disposed in the vicinity of the transporter to feed the threaded parts to the pallet member. A second feeder is also disposed in the vicinity of the transporter to feed the bottom parts to the pallet member. A lifter is disposed below the vehicle body to raise the lower the pallet member relative to the vehicle body. A turning machine is also disposed below the vehicle body for turning the threaded part to fasten the bottom part to the vehicle body when the pallet member is in its raised position.

14 Claims, 44 Drawing Sheets

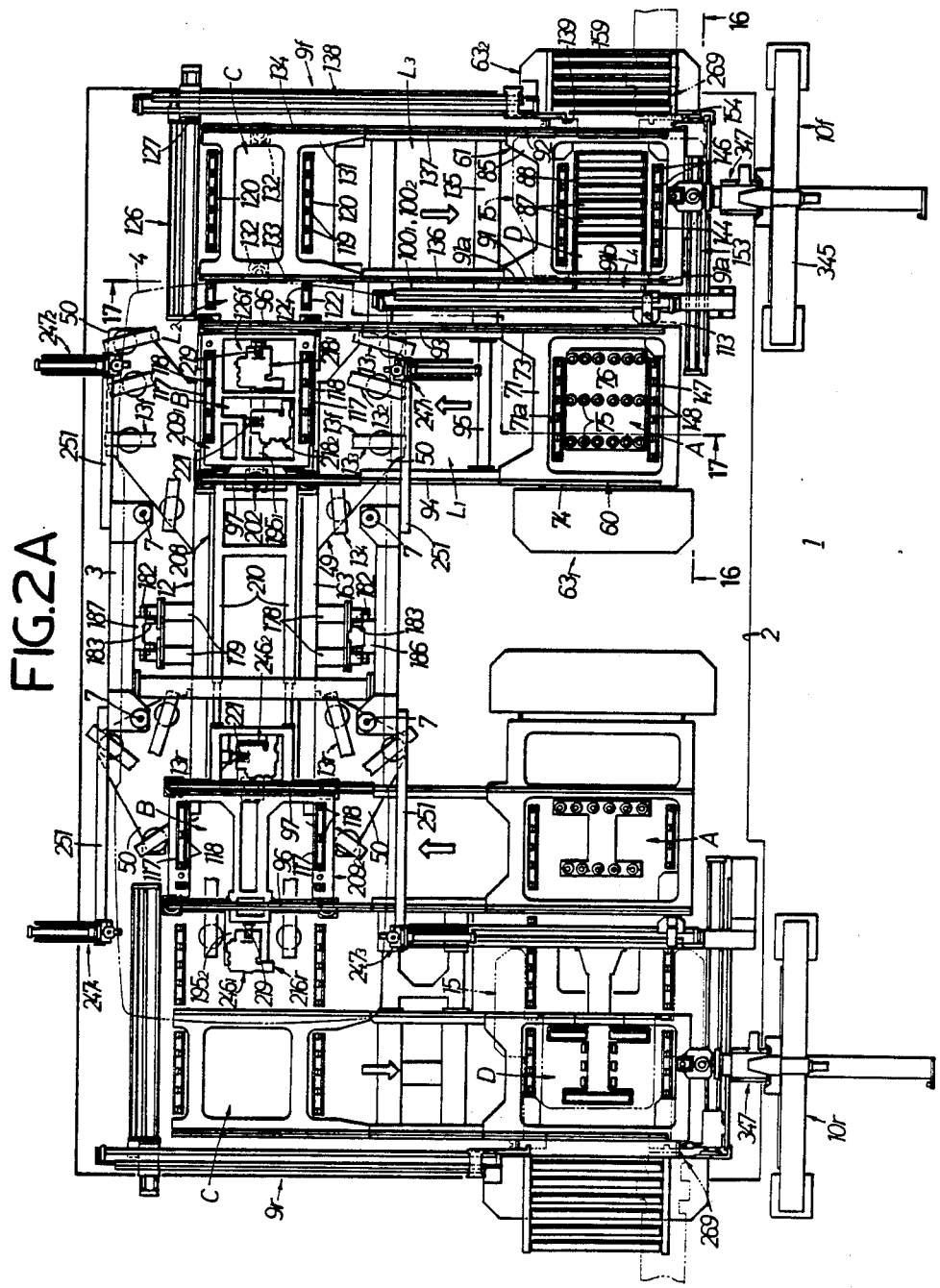

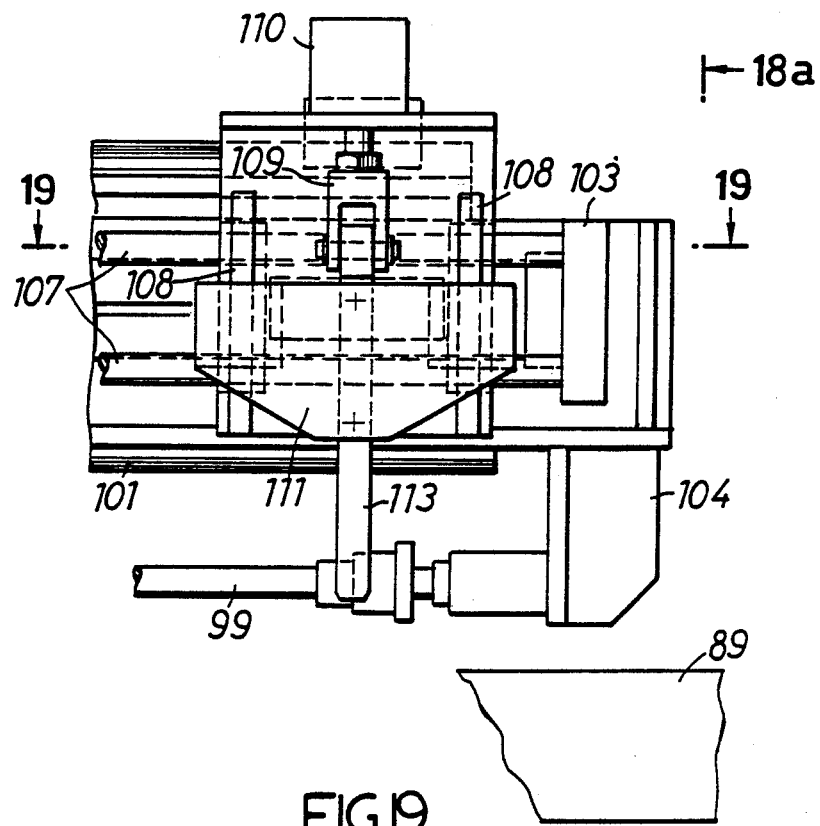
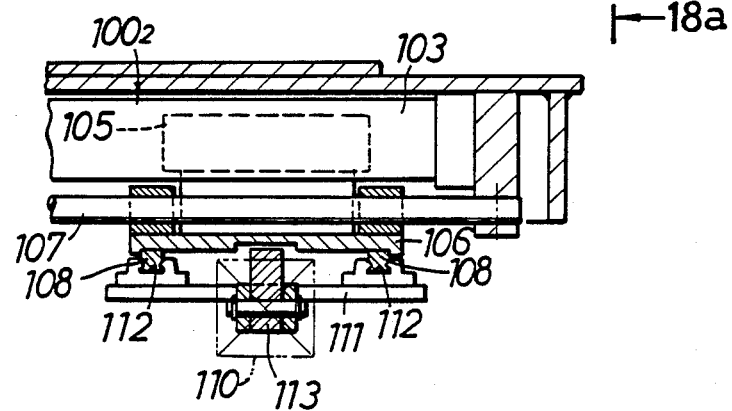

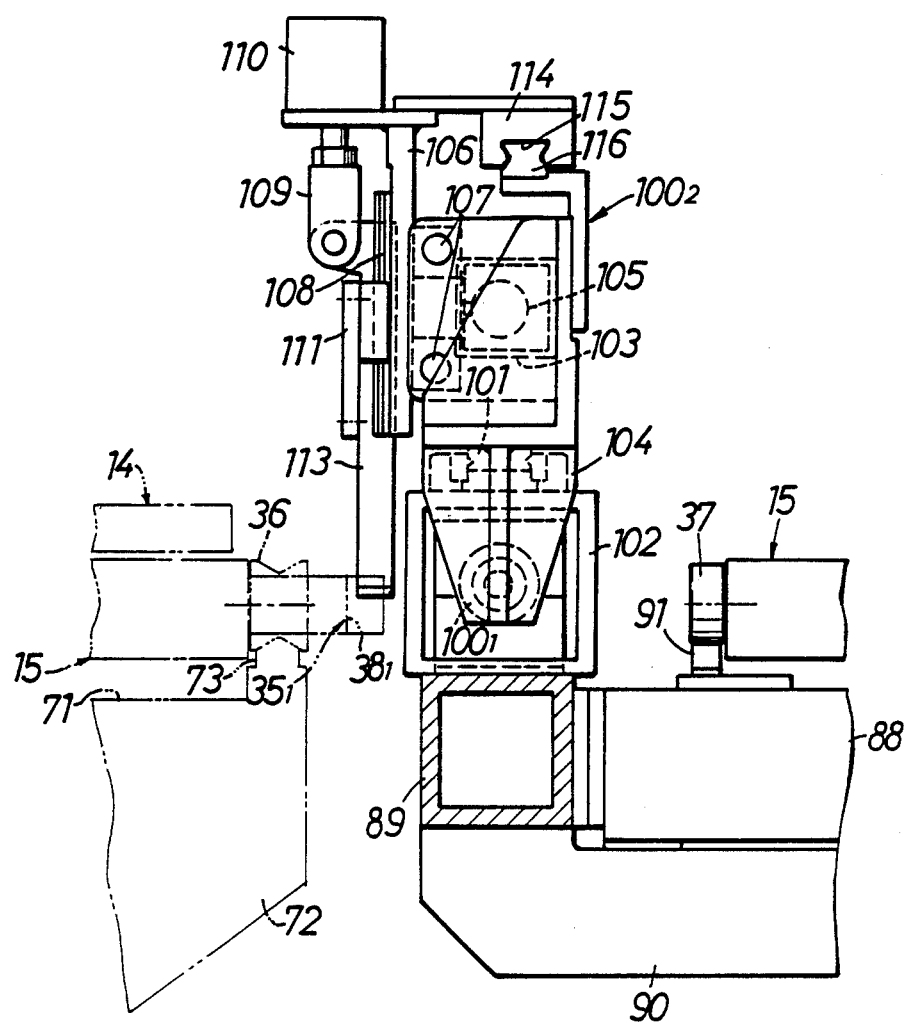

SYSTEM FOR ASSEMBLING BOTTOM PARTS FOR VEHICLES

BACKGROUND OF THE INVENTION

1. Field of the Invention

The present invention relates to a system for assembling bottom parts for vehicles, and particular, to such an assembling system in which bottom parts are transported to a position below a vehicle body which is positioned and fixed and are assembled to the vehicle body.

2. Description of the Prior Art

The present assignee has previously proposed a system of this type disclosed in Japanese Patent Application Laid-open No. 103665/81.

This system is arranged so that a pallet member for holding bottom parts thereon is attached to a hanger for transporting a vehicle body to manually fasten the bottom parts to the vehicle body.

In this system, however, the pallet member, while being synchronously moved relative to the hanger, is attached to the hanger and consequently, a complicated synchronizing mechanism and a complicated positioning mechanism are required. In addition, the bottom parts are manually fastened, resulting in a poor productivity. In this way, the prior art system has various factors which should be improved.

There is known an assembling system of such a type in which bottom parts, threaded parts such as bolts, and threaded part-turning machines are disposed on a single pallet member (see Japanese Patent Application Laid-open No. 220981/86).

However, this assembling system is accompanied by a problem that it is exclusively used for a selected type of vehicle and is poor in accommodation to a change in the type of vehicle.

Additionally, the assembling system is arranged to assemble the front and rear bottom parts on the basis of mounting holes in the vehicle body and hence, the front and rear bottom parts are assembled independently to the vehicle body. For this reason, it is feared that a misalignment or misregister may occur between them. The occurrence of such a misalignment or misregister requires a lot of time for adjustment of alignment at a post step for suspension parts.

A further problem associated with such assembling system is that the level of a lift table in a lifter of this system is detected on the basis of the amount of extension of a piston rod of a lifting operation cylinder and hence, cannot be accurately detected because a deflection of the piston rod is produced with the swinging movement of the operation cylinder.

There is also known an assembling system of such a type in which a misalignment or misregister between a vehicle body and a bottom part is detected, and a servo mechanism is operated to correct such misalignment or misregister. In this system, however, there is a problem that the servo mechanism must be operated even with a slight misalignment, resulting in a relatively large amount of time required for a correcting operation and in poor productivity.

Additionally, in assembling the bottom parts to the vehicle body from below the body, a bolt used as a threaded part with its head top face down must be fed to each bolt-tightening socket. However, it is a conventional practice to manually feed each bolt, which provided degraded workability and interferes with the productivity.

Further, there is also known an assembling system of such a type in which a plurality of turning machines are mounted integrally with a pallet member, each including a turning shaft which is advanced toward a to-be-fastened portion of a vehicle body while turning a threaded part. (see Japanese Patent Application Laid-open No. 220980/86).

In this assembling system, however, the following problem is encountered: differences in distance between the individual to-be-fastened portions of the vehicle body and the pallet member are compensated for by operation strokes of the turning shafts in the turning machines and therefore, turning machines of various types having different operation strokes must be provided, which is uneconomical.

The above assembling system is also accompanied by a problem that it is exclusively used for a selected type of vehicle and hence, in changing of the type of vehicle, the pallet must be replaced together with the plurality of turning machines, resulting in a poor accommodation to model changes.

SUMMARY OF THE INVENTION

It is an object of the present invention to provide an assembling system of the type described above, wherein the structure can be simplified, and the assembling operation can be automated.

It is another object of the present invention to provide an assembling system of the type described above, which can be satisfactorily accommodated to the changing of the type of vehicle.

It is a further object of the present invention to provide an assembling system of the type described above, in which front and rear bottom parts can be located relative to a vehicle body in their aligned or registered states.

It is a yet further object of the present invention to provide an assembling system of the type described above, in which the level of a lift table in a lifter can be detected accurately.

Further, it is an object of the present invention to provide an assembling system of the type described above, in which adjustment of the position of a vehicle body can be effected with a good efficiency, and the productivity can be improved.

A further object of the present invention is to provide an assembling system of the type described above, in which when a bolt is used as a threaded part, each bolt with its head top face down can be automatically fed to each bolt-tightening socket.

A still further object of the present invention is to provide an assembling system of the type described above, in which a plurality of turning machines having the same construction can be employed with different distances between portions to be fastened of a vehicle and a pallet member.

To accomplish the above objects, according to the present invention, there is provided a system for assembling bottom parts for vehicles, in which the bottom parts are transported to a position below a vehicle body positioned and fixed and are assembled to the vehicle body, the system comprising a transporter for circulating a pallet member for holding thereon bottom parts and a plurality of threaded parts for fastening the bottom parts to the vehicle body, so that the pallet member is stopped below the vehicle body, a first feeder disposed in the vicinity of the transporter to feed the threaded parts to the pallet member, a second feeder also disposed in the vicinity of the transporter to feed the bottom parts to the pallet member, a lifter disposed below the vehicle body to raise and lower the pallet member relative to the vehicle body, and a turning machine also disposed below the vehicle body for turning the threaded part to fasten the bottom part to the vehicle body when the pallet member is in its raised position.

In addition, according to the present invention, there is provided a system for assembling front and rear bottom parts of vehicles, in which the front and rear bottom parts are transported to a position below a vehicle body positioned and fixed and are assembled to the vehicle body, the system comprising a front transporter for circulating a front pallet member for holding thereon the front bottom parts and a plurality of threaded parts for fastening the front bottom parts to the vehicle body, so that the front pallet member is stopped below a front portion of the vehicle body, a rear transporter for circulating a rear pallet member for holding the rear bottom parts and a plurality of threaded parts for fastening the rear bottom parts to the vehicle body, so that the rear pallet member is stopped below a rear portion of the vehicle body, a first front feeder disposed in the vicinity of the front transporter to feed the threaded parts to the front pallet member, a first rear feeder disposed in the vicinity of the rear transporter to feed the threaded parts to the rear pallet member, a second front feeder disposed in the vicinity of the front transporter to feed the front bottom parts to the front pallet member, a second rear feeder disposed in the vicinity for the rear transporter to feed the rear bottom parts to the rear pallet member, a lifter disposed below the vehicle body to raise and lower the front and rear pallet members relative to the vehicle body, a front turning machine disposed below the vehicle body for turning the threaded part to fasten the front bottom part to the vehicle body when the front pallet member is in its raised position, and a rear turning machine disposed below the vehicle body for turning the threaded part to fasten the rear bottom part to the vehicle body when the rear pallet member is in its raised position.

Further, according to the present invention, there is provided a system for assembling bottom parts for vehicles, wherein the lifter includes a lift table and a lifting mechanism for lifting the lift table relative to the vehicle body, the lift table including a placing rest disposed thereon, the placing rest including a first placing portion which is located below a front portion of the vehicle body and onto which the front pallet member is placed, and a second placing portion which is located below a rear potion of the vehicle body and onto which the rear pallet member is placed.

Still further, according to the present invention, there is provided a system for assembling bottom parts for vehicles, wherein the placing rest is disposed in a floating state on the lift table, and one of the front and rear pallet members is provided with a plurality of locating pins which are adapted to be fitted into a plurality of locating holes in the vehicle body, respectively, when such pallet member is in its raised position.

According to the present invention, there is also provided a system for assembling bottom part for vehicles, wherein the lifter includes a base, a lift table disposed above the base, and a lifting mechanism having an X-type link interposed between the base and the lift table, the X-type link located on the base being provided at its pivoting point with a detecting mechanism adapted to convert the pivoting angle of the pivoting point into an indication of the level of the lift table.

Additionally, according to the present invention, there is provided a system for assembling bottom parts for vehicles, wherein the pallet member includes a plurality of locating pins which are adapted to be fitted into a plurality of locating holes in the vehicle body, and mating threaded parts for the threaded parts are held on the vehicle body for movement in a horizontal plane.

Further, according to the present invention, there is provided a system for assembling bottom parts for vehicles, wherein the lifter includes a lift table, and a lifting mechanism for raising and lowering the lift table relative to the vehicle body, and the system further includes a movable placing rest which is located below the vehicle body and onto which the pallet member is placed, a placing rest-displacing mechanism connected to the placing rest so that the latter has a predetermined amount of floating movement the placing rest and the displacing mechanism being disposed on the lift table, and a correcting mechanism adapted to detect a misregister of the vehicle body to operate the displacing mechanism, when the misregister amount exceeds the floating amount.

Further, according to the present invention, there is provided a system for assembling bottom parts for vehicles, wherein the threaded part is a bolt, and the pallet member includes a plurality of bolt-tiqhteninq sockets opened upward so that the bolt with its head top face down may be fed thereinto, and wherein the first feeder comprises a transfer mechanism for transferring the bolts one by one with their head top faces up, a delivery mechanism movable between a holding position to hold a plurality of the bolts transferred by the transfer mechanism by grasping them one by one, and a delivery position to release the holding for all the bolts at a time, and a dispensing mechanism movable between a receiving position to receive the bolts at the delivery position and a feeding or dispensing position to dispense the bolts to the sockets, the dispensing mechanism including a receiving portion adapted to receive the bolts with their head top faces up at the receiving position and then rotate through 180° to turn the head top faces down.

Further, according to the present invention, there is provided a system for assembling bottom parts for vehicles, comprising a pallet member spaced apart at different distances from portions to be fastened of the vehicle body for holding thereon bottom parts and a plurality of threaded parts for fastening the bottom parts to the vehicle body in order to transport the bottom parts to a position below the vehicle body positioned and fixed to superpose a plurality of fastening portions of the bottom parts onto the to-be-fastened portions of the vehicle body for assembling of them, a transporter for circulating the pallet member, so that the latter is stopped below the vehicle body, a first feeder disposed in the vicinity of the transporter for feeding the threaded parts to the pallet member, a second feeder also disposed in the vicinity of the transporter for feeding the bottom parts to the pallet member, a lifter disposed below the vehicle body for raising and lowering the pallet member relative to the vehicle body, and a plurality of turning machines also disposed below the vehicle body for turning the threaded parts to fasten the bottom parts to the vehicle body, when the pallet member is in its raised position, the pallet member including a plurality of sockets movable toward and away from and turnable relative to the to-be-fastened portions of the vehicle body respectively for holding the threaded parts, each of the turning machines being disposed in a separated relation to the pallet member in a corresponding one of the sockets and including a turning shaft for moving each of the sockets toward the corresponding one of the to-be-fastened portions while turning it, with operational strokes of the individual turning shafts being set uniformly by varying the lengths of the individual sockets.

With the above arrangements, the bottom parts are fastened to the vehicle body positioned and fixed and therefore, complicated synchronizing and positioning mechanisms are unnecessary, and this makes it possible to simplify the structure.

In addition, feeding of the bottom parts and the threaded parts to the circulated pallet member, a stoppage of the pallet member below the vehicle body subsequent to the raising thereof, and turning of the threaded parts can be continuously conducted, thereby automating the assembling of the bottom parts to the vehicle body. In this case, fitting of the locating pins of the pallet member into the locating holes in the vehicle body causes the bottom parts to be located relative to the vehicle body and in this state, the threaded parts are threadedly inserted into the mating threaded parts movable in a horizontal plane. Accordingly, even if a somewhat misregister or misalignment of the threaded part is produced, such threadedly inserting operation can be reliably performed to attain the assembling of the bottom parts. Additionally, in changing of the type or model of vehicle, it is possible to easily accommodate such changing only by replacement of the pallet member, changing in position of the turning machines and so on, because the pallet member is separated from the threaded part-turning machines.

The distance between the first and second placing portions may be changed for changing of the wheel base size, while replacement of the front and rear pallet members and changing in position of the front and rear turning machines or the like may be carried out for changing of the front and rear bottom parts. This provides a good accommodation in changing of the type or model of vehicle.

Moreover, because the first and second placing portions are interconnected, good alignment can be provided between the front and rear bottom parts, even if the pallet members are divided longitudinally.

Further, by having the placing rest in a floating state, the cooperation of the location pins located on one of the front and rear pallet members and the locating holes in the vehicle body enables the front and rear bottom parts to be located and assembled easily in their aligned state to the vehicle body. This makes it possible to easily carry out the adjustment of alignment of suspension parts in a short time.

Yet further, there is less deflection of the pivoting point of the X-type link in the lifter, thereby enabling the detecting mechanism to detect the level of the lift table with accuracy.

Further, in adjustment of the position of the vehicle body, the misalignment or misregister of the vehicle body can be corrected by a slight movement corresponding to the floating amount of the placing rest, when the misalignment or misregister amount of the vehicle body is less then the floating amount of the placing rest.

On the other hand, with a misregister amount of the vehicle body exceeding the floating amount of the placing rest, the misalignment can be corrected by movement of the placing rest by means of the displacing mechanism.

Accordingly, the need for operating the displacing mechanism every time in adjustment of alignment of the vehicle body is eliminated and therefore, the correcting time can be shortened to provide an improvement in productivity.

Further, the first feeder can be used to automatically feed the bolts with their head top faces down to the corresponding bolt-tightening sockets. In addition, as a result of disposition of the delivery mechanism between the transfer mechanism and the dispensing mechanism, the delivery mechanism can be utilized to provide the bolt-holding operation during operation of the dispensing mechanism to eliminate the play time of the dispensing mechanism. Moreover, since the dispensing mechanism is designed to receive the plurality of bolts at a time, the operation of delivery of the bolts one by one to the dispensing mechanism can be carried out with good efficiency and reliability, as compared with reception of the bolts one by one by the dispensing mechanism.

Additionally, since the operation strokes of the turning shafts of the individual turning machines are set uniformly by varying the lengths of the individual sockets as described above, the same construction can be employed for each of the turning machines. On the other hand, changing of the model or type of vehicle can be easily accommodated by a replacement of the pallet member, or changing the positions of the turning machines used in combination.

The above and other objects, features and advantages of the invention will become apparent from reading of the following detailed description of the preferred embodiments, taken in conjunction with the accompanying drawings.

BRIEF DESCRIPTION OF THE DRAWINGS

FIGS. 1, 2 and 2A illustrate the entire assembling system according to the present invention, wherein FIG. 1 is a perspective view of the system;

FIG. 2 is a schematic plan view thereof; and

FIG. 2A is a plane view of details thereof;

FIG. 3 is a plan view illustrating a relationship between a vehicle body and front and rear bottom parts and the like;

FIGS. 4 to 6 illustrate a work set pallet, wherein

FIG. 4 is a plan view of the work set pallet;

FIG. 5 is a view taken in a direction of an arrow 5 in FIG. 4; and

FIG. 6 is a view taken in a direction for an arrow 6 in FIG. 4;

FIGS. 7 and 8 illustrate a bolt set pallet, wherein

FIG. 7 is a plan view thereof; and

FIG. 8 is a view taken in a direction of an arrow 8 in FIG. 7;

FIGS. 9 to 11 illustrate a relationship between sockets for holding bolts and portions of the vehicle body which are to be fastened, wherein FIGS. 9(a), 9(b) and 9(c) are side views in longitudinal section;

FIG. 10 is a view taken in a direction of an arrow 10—10 in FIG. 9; and

FIG. 11 is a view taken in a direction of an arrow 11 in FIG. 9;

FIGS. 12 to 14 illustrate a relationship among the work set pallet, the bolt set pallet and the front bottom parts, wherein FIG. 12 is a plan view;

FIG. 13 is a view taken in a direction of an arrow 13 in FIG. 12; and

FIG. 14 is a view taken in a direction of an arrow 14 in FIG. 12;

FIGS. 16, 17, 18, 18A and 19 illustrate mechanisms for superposing and separating the work set pallet and the bolt set pallet, wherein FIG. 16 is a view taken in a direction of arrow 16—16 in FIG. 2A;

FIG. 17 is a sectional view taken along a line 17—17 in FIGS. 2A and 16;

FIG. 18A is a sectional view taken along a line 18a-18a in FIG. 18;

FIG. 19 is a sectional view taken along a line 19—19 in FIG. 18;

FIGS. 20 to 31 illustrate a relationship between a lifter and the vehicle body and the like, wherein FIG. 20 is a side view FIG. 21 is a sectional view taken along a line 21—21 in FIG. 20 when the lifter has been raised;

FIG. 22 is an enlarged sectional view of a portion encircled by a chain line indicated by an arrow 22 in FIG. 20;

FIG. 23 is a view taken in a direction of an arrow 23—23 in FIG. 20;

FIG. 24 is a view taken in a direction of an arrow 24—24 in FIG. 23;

FIG. 25 is a view taken in a direction of an arrow 25—25 in FIG. 23;

FIG. 26 is a sectional view taken along a line 26—26 in FIG. 24;

FIG. 27 is a sectional view taken along a line 27—27 in FIG. 23;

FIG. 28 is an enlarged view of a portion encircled by a chain line indicated by an arrow 28 in FIG. 23;

FIG. 29 is a view taken in a direction of an arrow 29—29 in FIG. 28;

FIG. 30 is a sectional view taken along a line 30—30 in FIG. 28; and

FIG. 31 is a sectional view taken along a line 31—31 in FIG. 30;

FIGS. 32 to 34 illustrate a sensor unit, wherein

FIG. 32 is a sectional view taken along a line 32—32 in FIG. 3;

FIG. 33 is a view taken in a direction of an arrow 33 in FIG. 32; and

FIG. 34 is a sectional view taken along a line 34—34 in FIG. 33;

FIGS. 35 to 37 illustrate a front bolt feeder, wherein

FIG. 35 is a plan view thereof;

FIG. 36 is a sectional view taken along a line 36—36 in FIG. 35; and

FIG. 37 is a view taken in a direction of an arrow 37—37 in FIG. 36;

FIG. 38 to 44 illustrate a bolt transfer mechanism and a delivery mechanism, wherein FIG. 38 is a sectional view taken along a line 38—38 in FIGS. 36–40;

FIG. 39 is a view taken in a direction of an arrow 39-39 in FIG. 38;

FIG. 40 is a sectional view taken along a line 40—40 in FIG. 38;

FIG. 41 is a sectional view taken along a line 41—14 in FIG. 38;

FIG. 42 is a sectional view taken along a line 42—42 in FIG. 38;

FIG. 43 is a sectional view taken along a line 43—43 in FIG. 38; and

FIG. 44 is a sectional view taken along a line 44—44 in FIG. 40; and

FIG. 45 to 47 illustrate the details of a dispensing mechanism, wherein

FIG. 45 is a front view of the dispensing mechanism;

FIG. 45 is a front view of the dispensing mechanism;

FIG. 46 is a view taken in a direction of an arrow 46 in FIG. 45; and

FIG. 47 is an enlarged and cutaway front view of the details.

DESCRIPTION OF THE PREFERRED EMBODIMENTS

Figure 1:
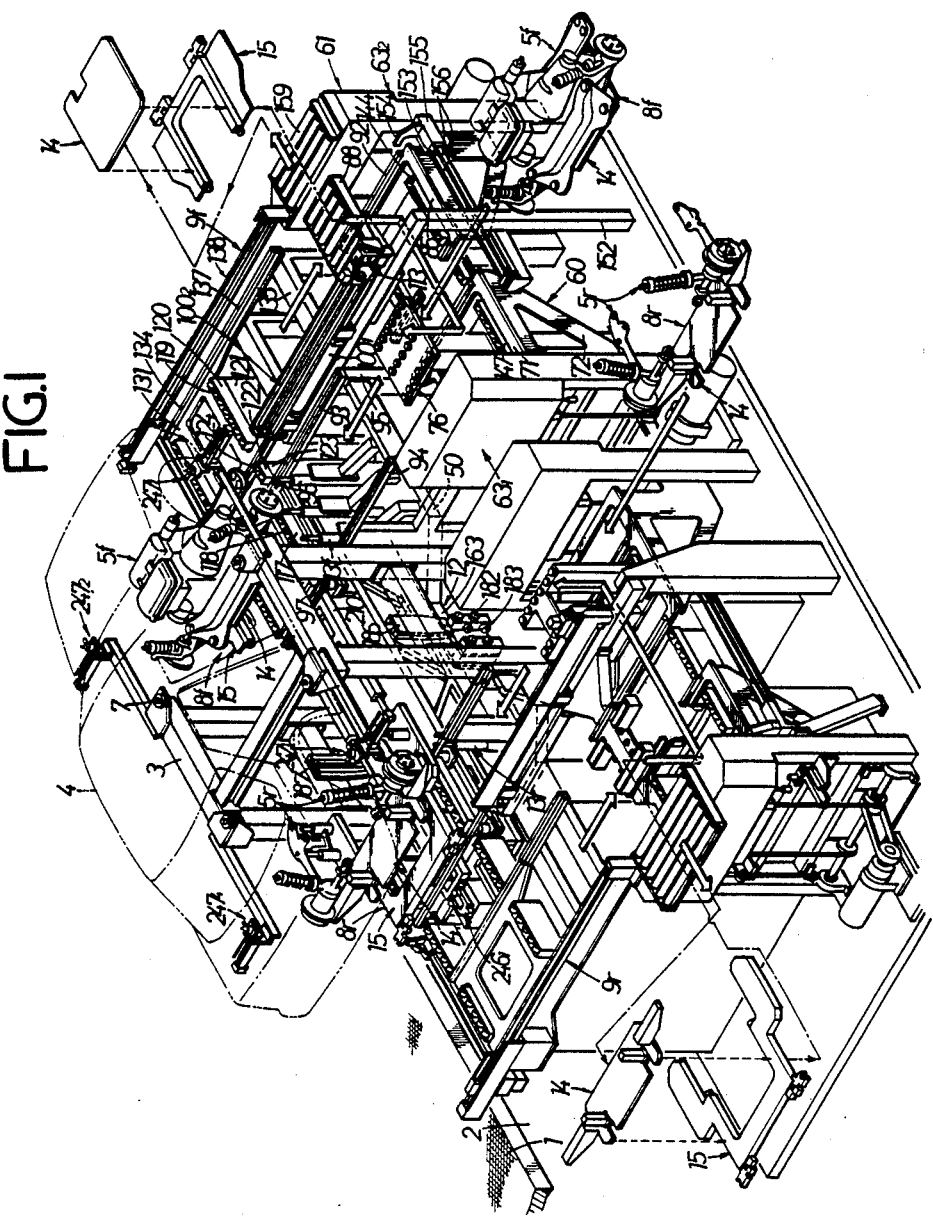
Figure 2:
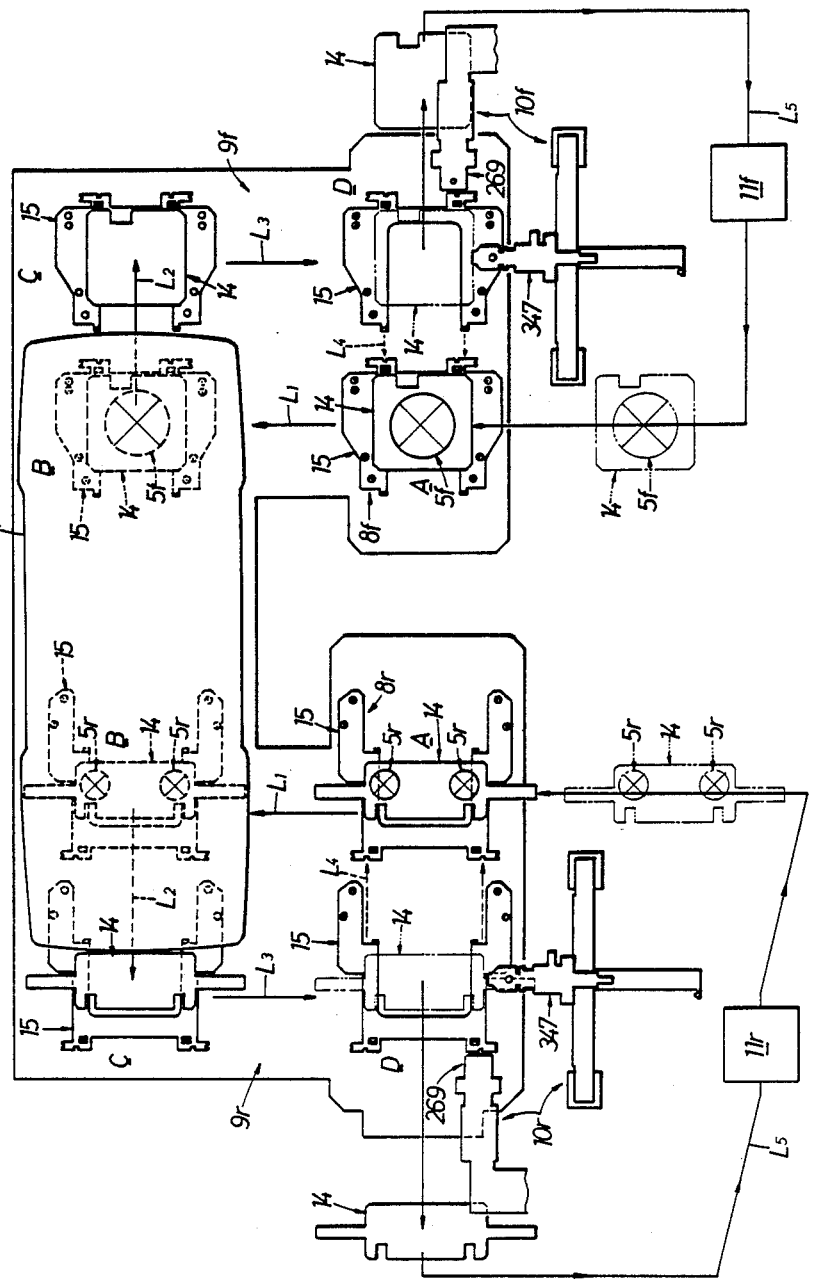

FIGS. 1, 2 and 2A illustrate an entire assembling system according to one embodiment of which components are disposed within a pit 2 opened in a floor 1 and in the vicinity thereof. The system is designed to transport front and rear bottom parts 5f and 5r to a position below the front and rear portions of a vehicle body 4 positioned and fixed on a support base 3 and to automatically mount them on to the vehicle body 4. The positioning of the vehicle body 4 is carried out by fitting a pair of plate-locating holes 6 provided in front and rear portions on the opposite sides of the vehicle body 4 over locating pins 7 on the support base 3, respectively.

The assembling system comprises front and rear transporters 9f and 9r for circulating front and rear pallet members 8f and 84, so that they may be stopped below the vehicle body 4. The pallet members are adapted to carry thereon the front and rear bottom parts 5f and 5r and washer faced bolts as a plurality of screw parts for fastening these bottom parts to the vehicle body 4. Front and rear bolt feeders 10f and 10r as first front and rear feeders are disposed on the vicinity of the transporters 9f and 9r to feed a plurality of bolts to the pallet members 8f and 8r. Second front and rear feeders 11f and 11r likewise are disposed in the vicinity of the front and rear transporters 9f and 9r to feed the front and rear bottom parts 5f and 5r to the front and rear pallet members 8f and 8r. A lifter 12 is disposed below the vehicle body to raise and lower the front and rear pallet members 8f and 8r relative to the vehicle body 4. A plurality of front and rear turning machines 13f and 13r also are disposed below the body 4, on the lifter 12 in the shown embodiment, for turning the bolts to fasten the front and rear bottom parts to the vehicle body 4 when the front and rear pallet members 8f and 8r are in their raised positions.

The support base 3, the front and rear transporters 9f and 9r and the lifter 12 are disposed in a pit 2, and the front and rear bolt feeders 10f and 10r and the second front and rear feeders 11f and 11r are disposed on the floor 1.

The aforesaid various components have substantially similar constructions and functions for the front and rear portions of the vehicle body 4 and hence, the various components on the front side will be primarily described below.

I. Front pallet member 8f

Figure 4:
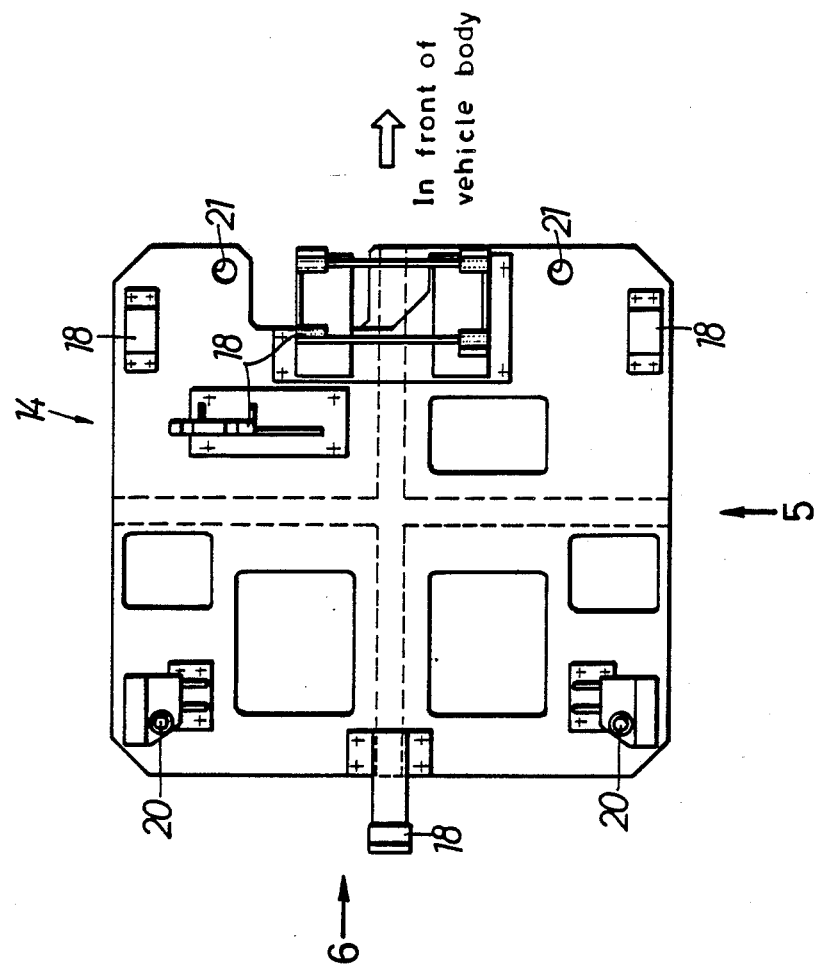
Figure 5:
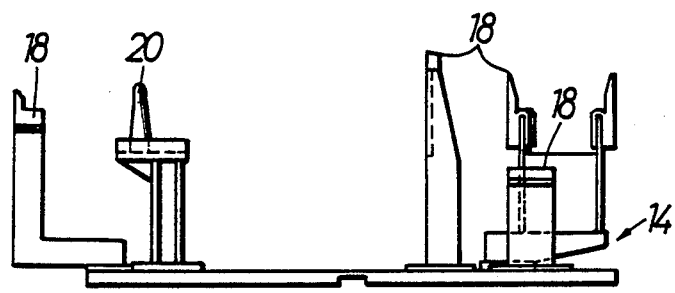
Figure 6:
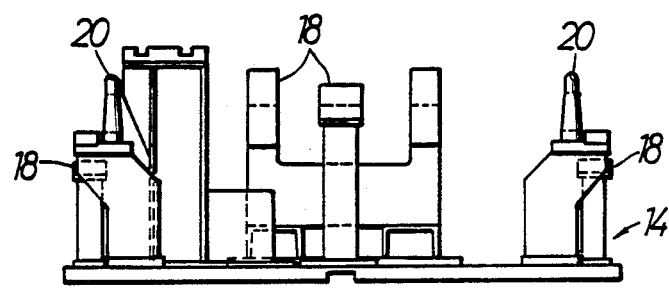
Figure 7:
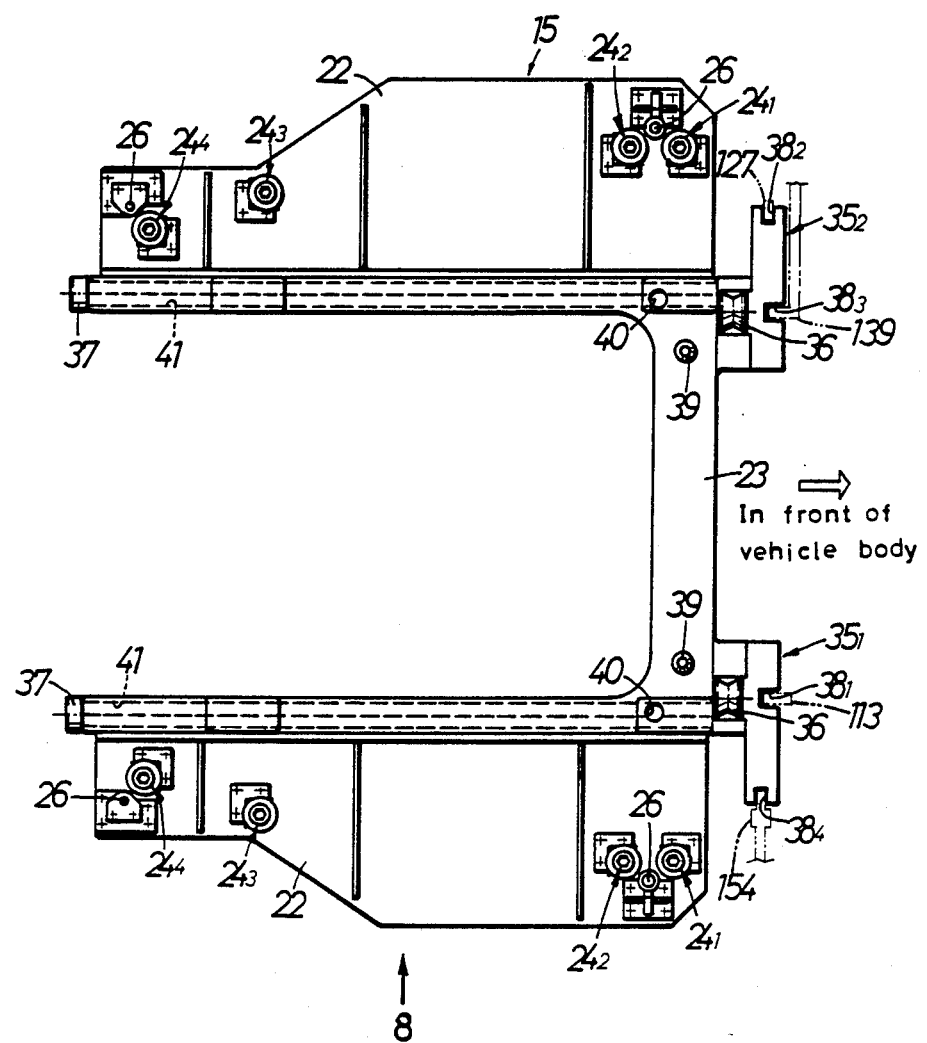
Figure 8:
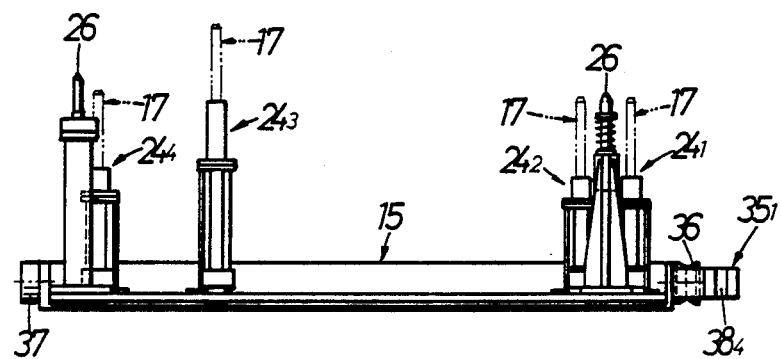

The front pallet member 8f is comprised of a work set pallet 14 shown in FIGS. 4 to 6 and a bolt set pallet 15 shown in FIGS. 7 and 8, which pallets 14 and 15 are adapted to be superposed the former on the latter. The work set pallet 14 carries thereon the front bottom part 5f unitized with an engine, a front suspension and the like, while the bolt set pallet 15 carries thereon a plurality of bolts 17 each having a washer 16 (FIGS. 8 and 9) for fastening the front bottom part 5f to the vehicle body 4.

(i) Work set pallet 14

Figure 12:
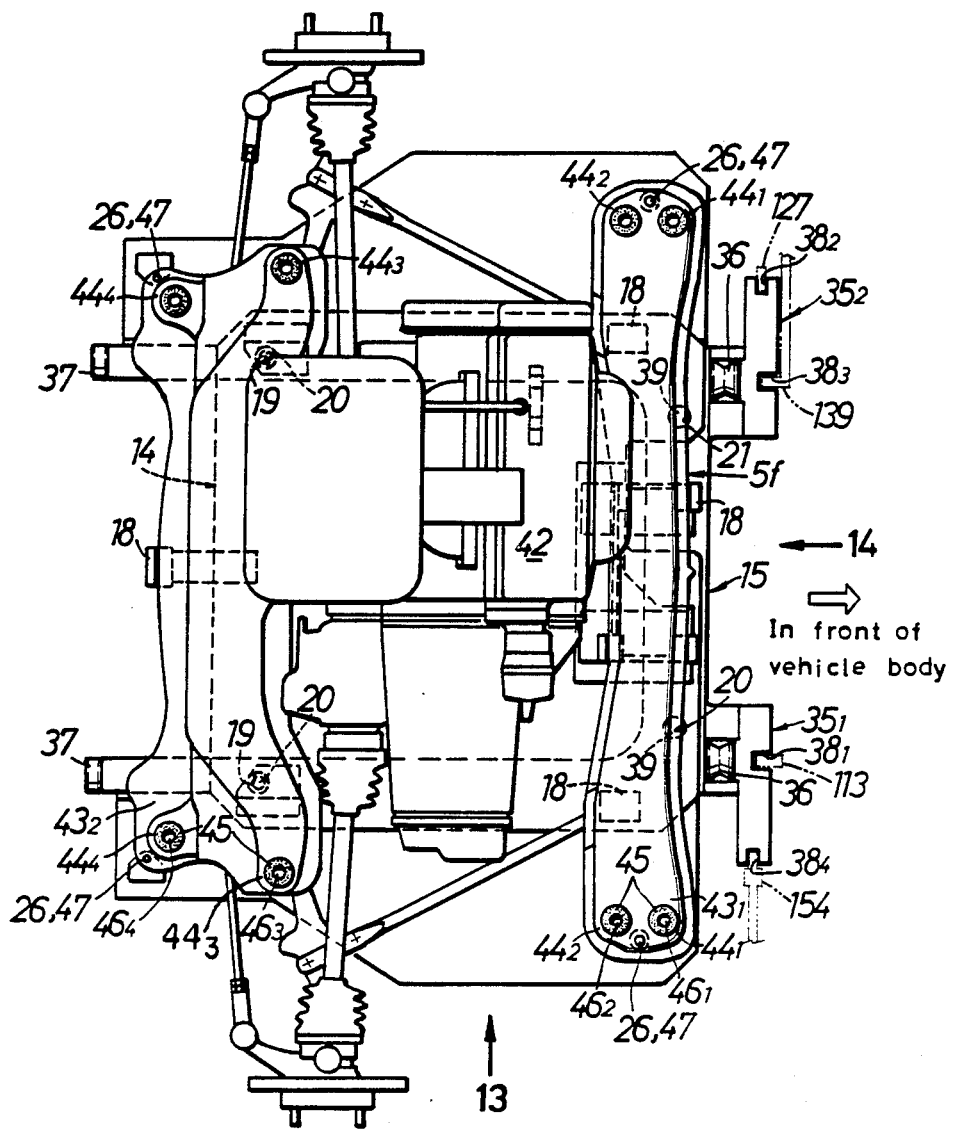

Referring to FIGS. 4 to 6, the work set pallet 14 is generally planarly square, and has, on its upper surface, a plurality of resting portions 18 provided on front and rear sides as viewed in a lengthwise direction of the vehicle body, and a pair of locating pins 20 provided in projection on the rear side as viewed in the lengthwise direction of the vehicle body and adapted to fit into a pair of locating holes 19 (FIG. 12) in the front bottom part 5f. The work set pallet 14 further has a pair of locating holes 21 provided on the front side as viewed in the lengthwise direction of the vehicle body, for connection with the bolt set pallet 15.

(ii) Bolt set pallet 15

As shown in FIGS. 7 and 8, the bolt set pallet 15 is formed into a generally planarly U-shape from a pair of socket-disposed portions 22 extending in the lengthwise direction of the vehicle body and a connecting portion 23 for connecting front ends of the both socket-disposed portions 22 as viewed in the lengthwise direction of the vehicle body.

Each of the socket-disposed portions 22 has a pair of first and second bolt-tightening sockets $24_1$ and $24_2$ and a pair of third and fourth bolt-tightening socket $24_3$ and $24_4$ disposed on an upper surface thereof on the front and rear sides as viewed in the lengthwise direction of the vehicle body for advancing and retreating movements and turning movement relative to portions of the vehicle body 4 which are to be fastened. Locating pins 26 are projectingly provided between the first and second sockets $24_1$ and $24_2$ and in the vicinity of the fourth sockets $24_4$ adapted to fit into four locating holes 25 (FIG. 3) made in the front portion of the vehicle body 4, respectively.

The construction of the individual sockets $24_1$ to $24_4$ as well as supporting structures thereof are substantially identical and hence, only the first $24_1$ will be described below with reference to FIGS. 9(a) and 10.

The first socket $24_1$ is comprised of a shank 27, a first cylindrical portion $28_1$ fitted over an outer peripheral portion at an upper end of the shank 27 and opened upward so that head 17a of the bolt 17 may be fitted thereinto, and a second cylindrical portion $28_2$ connected to a lower end of the shank 27 and opened upward so that a turning shaft 29 (which will be described hereinafter) of the front turning machine 13f may be fitted thereinto.

The socket-disposed portion 22 of the pallet 15 is provided with an insert hole 30 and an angle support shaft 31 rising on its upper surface to encircle substantially halfway around the insert hole 30. An annular lock plate 32 is welded to an upper end face of the support shaft 31, and a guide tube 33 is welded to an inner side at a lower end of the support shaft 31.

When the first socket $24_1$ is in a retreated position, the shank 27 thereof is loosely inserted into a hole 34 in the lock plate 32 to extend along the support shaft 31, so that the first cylindrical portion $28_1$ projects upward from the lock plate 32 with its lower end locked to a peripheral edge of the hole 34, and the second cylindrical portion $28_2$ is loosely fitted in the guide tube 33.

The first and second sockets $24_1$ and $24_2$ have the same length $l_1$ and if the length of the third and fourth sockets $24_3$ and $24_4$ are represented by $l_3$ and $l_4$, a relationship of $l_1 < l_4 < l_3$ is established between the length $l_1$, $l_3$, and $l_4$ of the first to fourth sockets $24_1$ to $24_4$.

As clearly shown in FIG. 7, a pair of first and second transporting hook members $35_1$ and $35_2$ are secured to a front surface of the connecting portion 23 as viewed in the lengthwise direction of the vehicle body. A grooved wheel 36 having a rotational axis lying in parallel to the lengthwise direction of the vehicle body is contained in an opening of each of the hook members $35_1$ and $35_2$. A groove-free wheel 37 is mounted on a rear end of each socket-disposed portion 22 as viewed in the lengthwise direction of the vehicle body, with a rotational axis likewise laying in parallel to such lengthwise direction.

The first and second hook members $35_1$ and $35_2$ are provided respectively with first and third U-shaped engaging portions $38_1$, and $38_3$ cut in the direction of the front of the vehicle body 4. Further, the first hook member $35_1$ is provided with a fourth U-shaped engage portion $38_4$ cut in the direction of the right and sideways of the vehicle body 4, and the second hook member $35_2$ is provided with a second U-shaped engage portion $38_2$ cut in the direction of the left and sideways of the vehicle body 4.

In the vicinity of the both grooved wheels 36, a pair of locating pins 39 are mounted on an upper surface of the connecting portion 23 to project therefrom, and are adapted to fit into the corresponding one of the locating holes 21 (FIG. 4) in the work set pallet 14.

Figure 24:
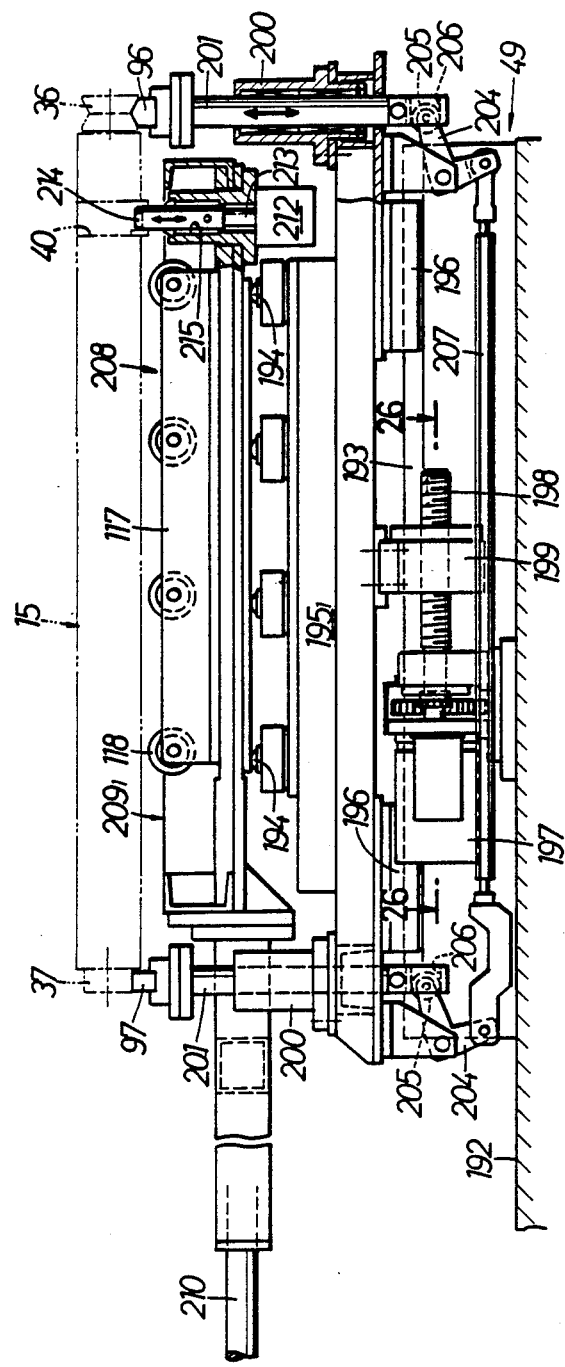

A locating hole 40 is made laterally outside each of the locating pins 39 and is used to locate the bolt set pallet 15 in an assembling operation (FIG. 24).

An angle guide groove 41 is defined in a lower surface of each of opposed edges of the both socket-disposed portions 22 to extend in parallel to the corresponding rotational axes of the wheels 36 and 37.

(iii) Relationship among the front bottom part 5f, the work set pallet 14, the bolt set pallet 15, the vehicle body 4 and the front turning machine 13f As shown in FIGS. 9 and 12 to 14, an engine 42 and front and rear sub-frames $43_1$ and $43_2$ therefor in the front bottom part 5f are placed onto the individual resting portions 18 of the work set pallet 14, wherein the pair of locating pins 20 are fitted into the pair of locating holes 9 to provide the locating of the front bottom part 5f relative to the work set pallet 14.

In the thus-located state, the opposite ends of each of the front and rear sub-frames $43_1$ and $43_2$ project from the work set pallet 14, and functions as a fastening portion relative to the vehicle body 4. In the front sub-frame $43_1$, first and second bolt insert holes $46_1$ and $46_2$ are made in first and second fastening portions $44_1$ and $44_2$ and have a mounting member 45 secured therein. In the rear sub-frame $43_2$, third and fourth bolt insert holes $46_3$ and $46_4$ are likewise made in third and fourth fastening portions $44_3$ and $44_4$ and also have a mounting member 45 secured therein.

The bolt set pallet 15 is superposed onto a lower surface of the work set pallet 14, wherein the pair of locating pins 39 of the bolt set pallet 15 are fitted into the pair of corresponding locating holes 21 in the work set pallet 14 to insure the locating of the bolt set pallet 15 relative to the work set pallet 14.

Figure 9:
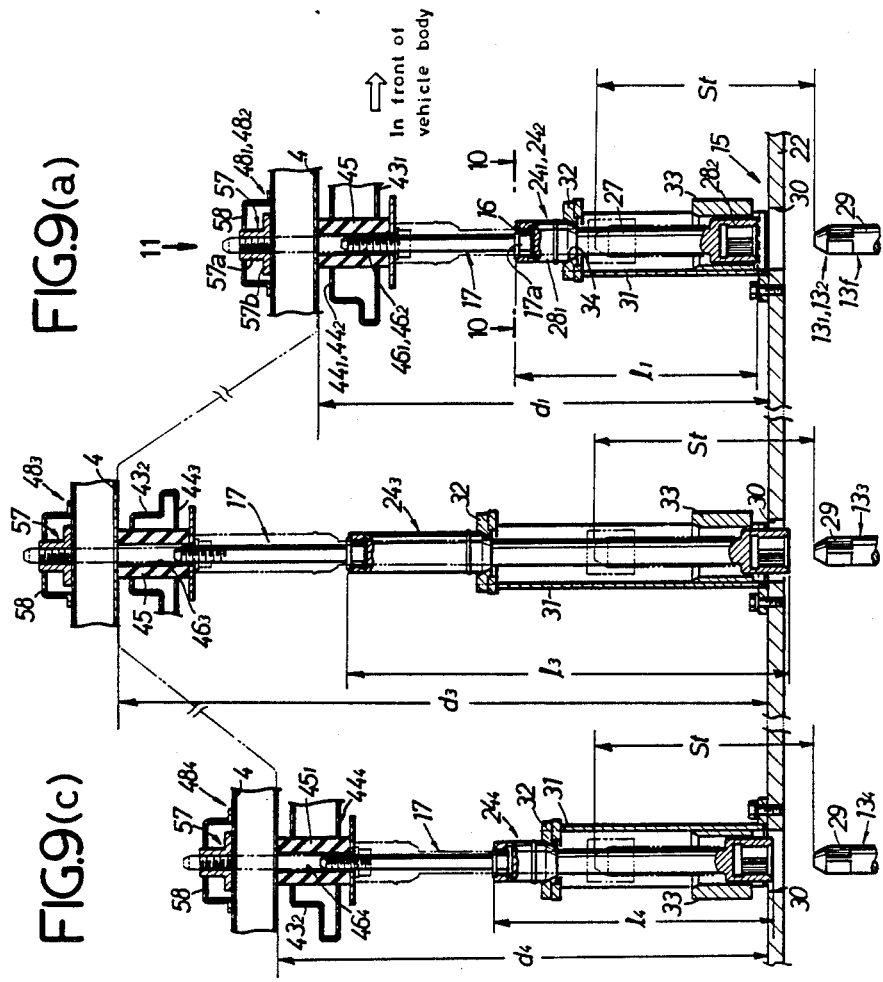
Figure 10:
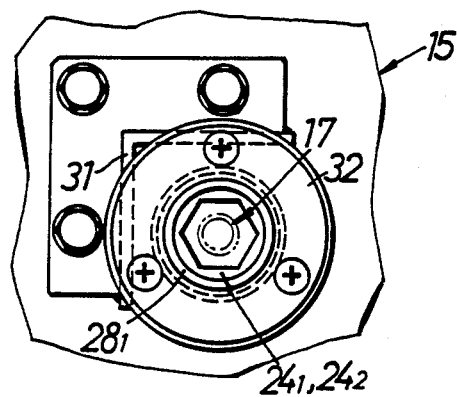

In the thus-located state, leading ends of the bolts 17 which have been fed to the first to fourth sockets to $24_1$ to $24_4$ prior to the aforesaid super position are inserted thorough the first to fourth bolt insert holes $46_1$, to $46_4$ as shown in FIG. 9. The individual locating pins 26 are passed through the corresponding locating holes 47 in the front and rear sub-frames $43_1$ and $43_2$. In this superposed state, the bolt set pallet 15 or the like is raised by the lifter 12 and in the raised position thereof, the individual locating pins 26 are fitted into the corresponding locating holes 25 (FIG. 3) in the vehicle body 4.

Figure 3:
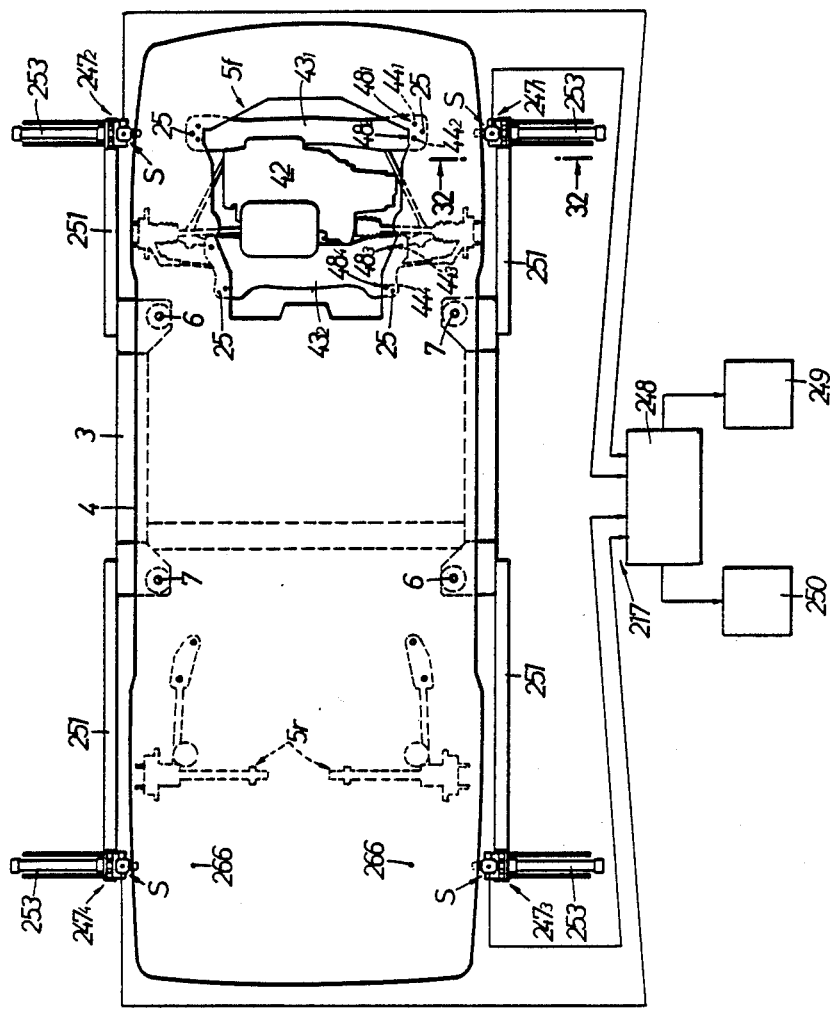
Figure 13:
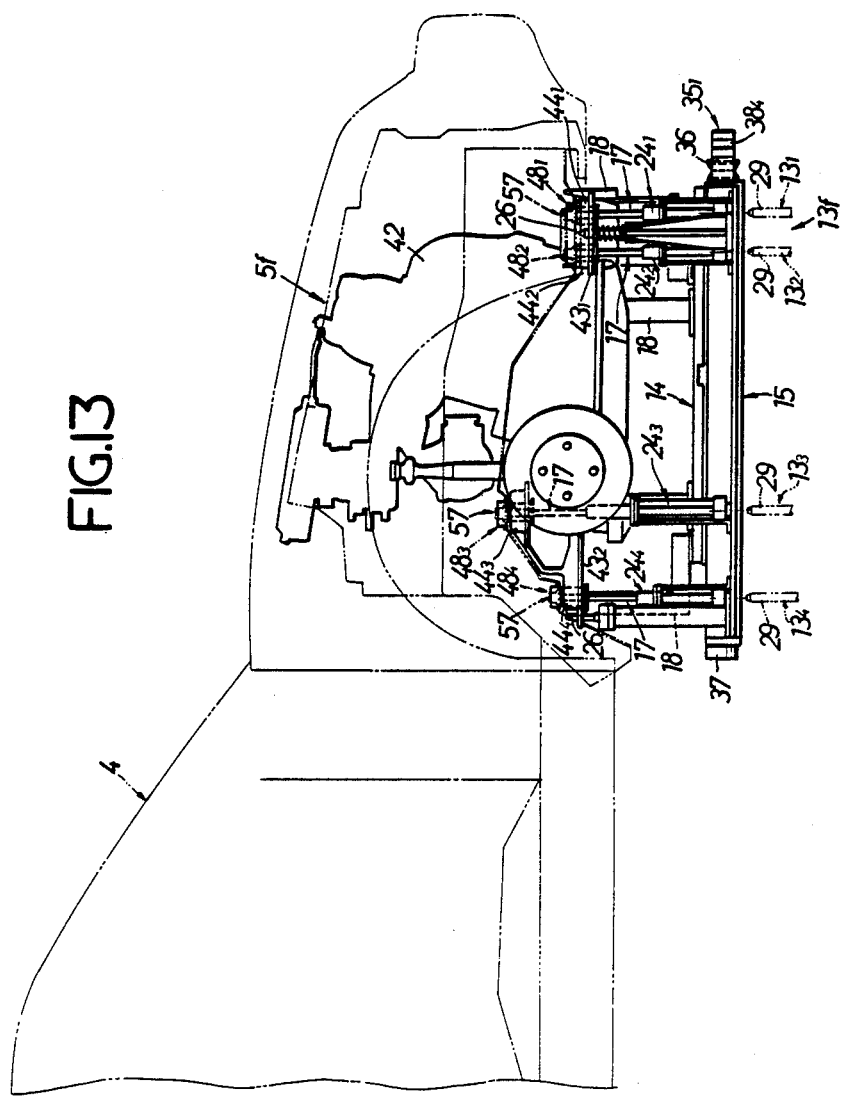
Figure 14:
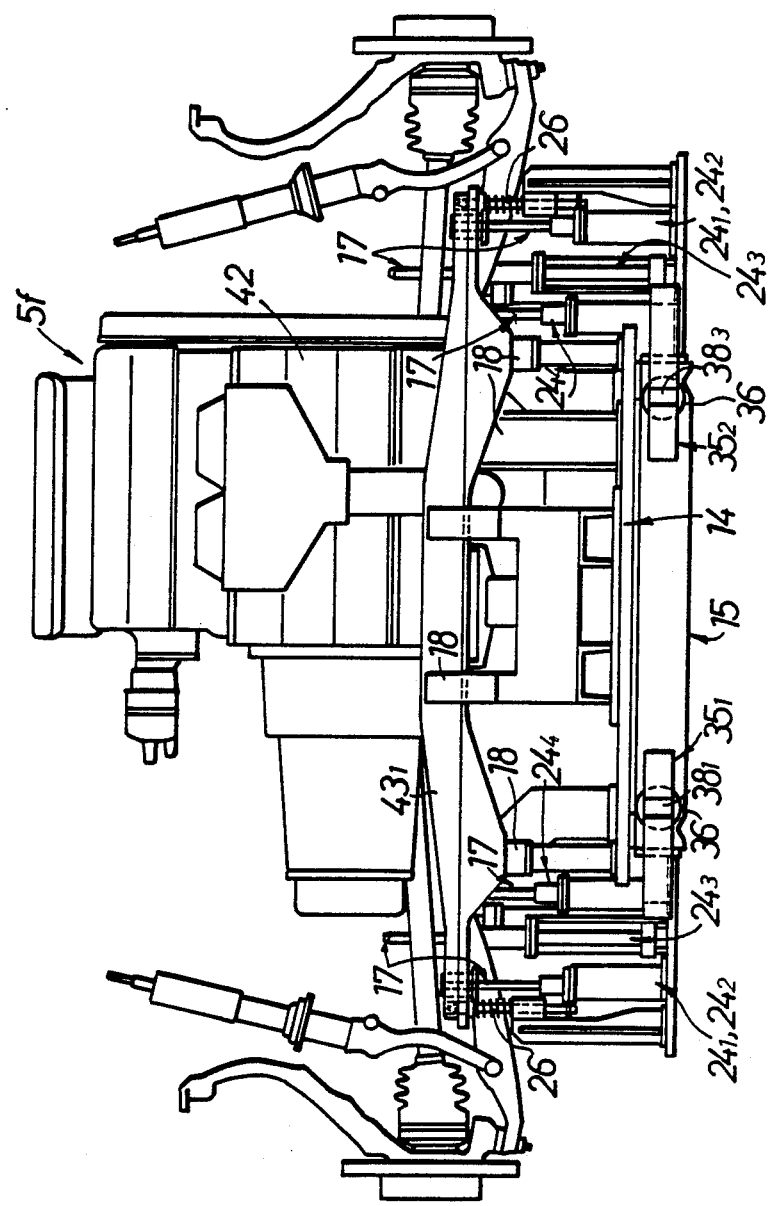

As clearly shown in FIGS. 3, 9 and 13, the first to respective four to-be-fastened portions $48_1$ to $48_4$ at the fourth left and right positions on the vehicle body 4 are spaced apart at different distances from the bolt set pallet 15. More specifically, the distances between the first and second front to-be-fastened portions $48_1$ and $48_2$ and the bolt set pallet 15 are equal to each other. If these distances are set at $d_1$, and the distance between the third to-be-fastened portion $48_3$ and the bolt set pallet 15 is at $d_3$ and further, the distance between the fourth to-be-fastened portion $48_4$ and the bolt set pallet 15 is at $d_4$, a relationship of $d_1 < d_4 < d_3$ is established among these distances $d_1$, $d_3$ and $d_4$.

The individual fastening portions $44_1$ to $44_4$ of the front bottom part 5f are superposed onto the corresponding to-be-fastened portions $48_1$ to $48_4$ of the vehicle body 4 from below and hence, a similar relationship of distances is also established among the first to fourth fastening portions $44_1$ to $44_4$.

In a condition that such a relationship of distances is established, if the lengths $l_1$, $l_3$, $l_4$ of first to fourth sockets $24_1$ to $24_4$ are set at $l_1 < l_4 < l_3$ as described above, the operational strokes St of the respective turning shafts 29 of the first to fourth turning machines $13_1$ to $13_4$ disposed in correspondence to the first to fourth sockets $24_1$ to $24_4$ can be equalized and hence, as the turning machines $13_1$ to $13_4$, those having the same construction are employed.

The individual turning machines $13_1$ to $13_4$ are mounted on the lifter 12 separate from the front pallet member 8f and therefore, changing of the model or type of vehicle is easily possible by procedures for replacing the pallet member 8f and for changing the positions of the individual turning machines $13_1$ to $13_4$ used together.

Figure 15:
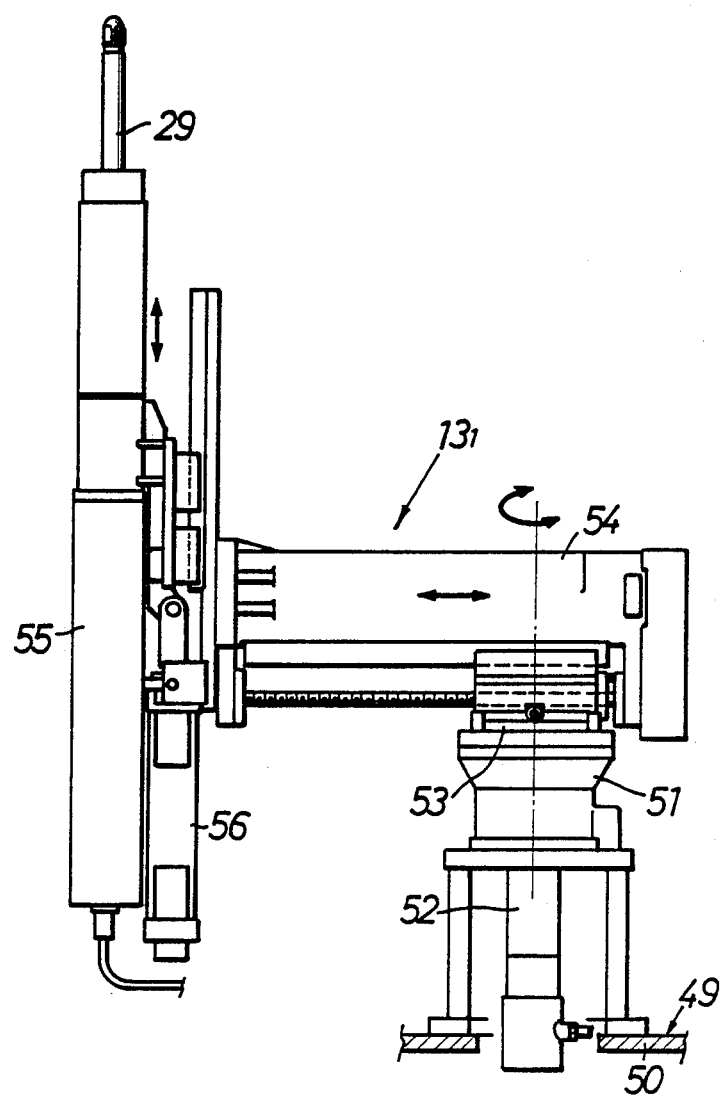
FIG. 15 is a side view of a turning machine.

FIG. 15 illustrates the first front turning machine $13_1$, and the outline thereof will be described. A support tube 51 having a vertical axis is fixedly mounted on a rest 50 (FIGS. 2A and 20) of a lift table 49 of the lifter 12. A support plate 53 is mounted above the support tube 51 for rotation about an axis of the support tube 51 by means of a servo motor 52. A horizontally extending movable element 54 is carried on the support plate 53 for movement in a horizontal direction by means of a drive motor contained therein. Further, rotational drive 55 having the rotary shaft 29 is carried on one end of the movable element 54 for movement in a vertical direction by means of a drive cylinder 56.

In fastening the front bottom part 5f, the rotational drive 55 is raised by means of the drive cylinder 56 to fit the rotary shaft 29, for example, into the second cylindrical portion $28_2$ of the first socket $24_1$ while rotating the shaft 29, so that the bolt 17 is screwed into a nut 57 as a mating threaded part located on the first to-be-fastened portion $48_1$.

Figure 11:
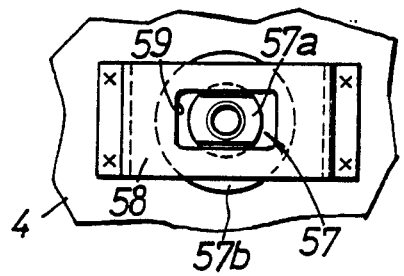

As shown in FIGS. 9 and 11, each nut 57 is comprised of a cylindrical portion 57a and a flange portion 57b provided on an outer peripheral surface at a lower end thereof, with a leading end of the cylindrical portion 57a being loosely inserted into a elongated hole 59 in a holding plate 58 mounted on each of the to-be-fastened portions $48_1$ o $48_4$ and being thus held on that to-be-fastened portion. This permits each nut 57 to have a predetermined amount of movability in a horizontal plane, so that even if there is some misalignment of the position of each nut 57, the aforesaid screwing operation can be reliably carried out to accomplish the assembling of the front part 5f.

Referring to FIG. 15, when the model or type of vehicle is changed, the position of each of the turning machines, i.e., the position of the rotational drive 55, can be easily changed by actuating the servo motor to rotate the support plate 53 and thus the moving member 54 and rotational drive 55 about the vertical axis, actuating the drive motor to move the movable element 54 and the rotational drive 55 in the horizontal direction, and actuating the drive cylinder 56 to move the rotational drive 5 in the vertical direction.

II. Front transporter 9f

Referring to FIGS. 1, 2 and 2A, the front transporter 9f includes a plurality of following transport lines: a first transport line L1 extending in the widthwise direction of the vehicle body from a pallet-superposing position A at the right hand side of the vehicle body 4 to a part-assembling position B below the vehicle body 4, a second transport line L2 extending in the lengthwise direction of the vehicle body from the part-assembling position B to a pallet discharge position C in front of the vehicle body 4, a third transport line L3 extending in parallel to the first transport line L1 from the pallet discharge position C to a pallet separating position D in forwardly obliquely right direction of the vehicle body 4, a fourth transport line L4 extending in parallel to the second transport line L2 from the pallet separating position D to the pallet superposing position A, and a fifth transport line L5 extending form the pallet separating position D around the fourth transport line L4 to the pallet superposing position A.

A superposing mechanism 60 is disposed at the pallet superposing position A for superposing the work set pallet 14 with the front bottom part 5f held thereon onto the bolt set pallet 15 with the plurality of bolts 17 held thereon in the above-described manner. The work set pallet 14 and the bolt set pallet 15 which have been superposed in this position A on each other are transported through the first transport line L1 to a part assembling position B and stopped thereto.

Disposed at the part assembling position B are the lifter 12 forming a part of the front and rear transporters 9f and 9t, the plurality of turning machines 13f for assembling the front bottom part 5f to the vehicle body 4, and the like. In the position B, the front bottom part 5f is assembled to the vehicle body 4.

After assembling, the work set pallet 14 and the bolt set pallet 15 are transported through the second transport line L2 to the pallet discharge position C and then through the third transport line L3 to the pallet separating position D.

Disposed in the vicinity of the pallet separating position D is the front belt feeder 10fp1 for feeding the bolts 17 to the bolt set pallet 15 in the superposed relation with the work set pallet 14. At the pallet separating position D, there is disposed a separating mechanism 61 for separating the work set pallet 14 and the bolt set pallet 15 from each other after feeding of the bolts 17.

After separating, the bolt set pallet 15 with the bolts 17 fed thereto is transported through the fourth transport line L4 to the pallet superposing position A. On the other hand, the work set pallet 14 is transported through the fifth transport line L5 and in the course of such transportation, the front bottom part 5f is fed thereto by the second feeder 11f disposed in the fifth transport line L5. After such feeding, the work set pallet 14 is transported to the pallet superposing position A where it is superposed onto the bolt set pallet 15 and thereafter, similar operations to those described above are carried out.

The superposing mechanism 60 is constructed as follows:

As shown in FIGS. 1, 2A, 16 and 17, a structural frame 62 for the assembling system is mounted on the bottom 2a of the pit 2. A slider 70 is mounted on a pair of posts 64 of a portal or gate type frame portion $63_1$ of the frame 62 adapted to be raised and lowered along guide rails 69 of the posts 64 through a plurality of guide rollers 68 by means of a drive motor 65, a speed reduction device 66, a transmitting member 67 and the like. A horizontal pallet rest 71 having a square opening 71a is connected to the slider 70 through a pair of brackets 72 for raising and lowering movement in a horizontal attitude.

A pair of rails 73 and 74 are laid in parallel on an upper surface of the pallet rest 71 to extend in the lengthwise direction of the vehicle body. One of the rails 73 closer to the pallet separating position D has an angled top surface, while the other has a flat top surface (FIG. 16), so that the grooved wheel 36 of the bolt set pallet 15 rolls on the one rail 73, while the groove-free wheel 37 rolls on the other rail 74.

A pallet supporting stand 76 having a plurality of steel balls 75 to support the work set pallet 14 is supported on an upper end of the support frame portion 77 of the structural frame 62 to lie in a raising and lowering locus for the opening 71a in the pallet rest 71.

In a raised position of the pallet rest 71, the top surfaces of the rails 73 and 74 are located above the individual steel balls 75 of the pallet supporting stand 76.

Figure 16:
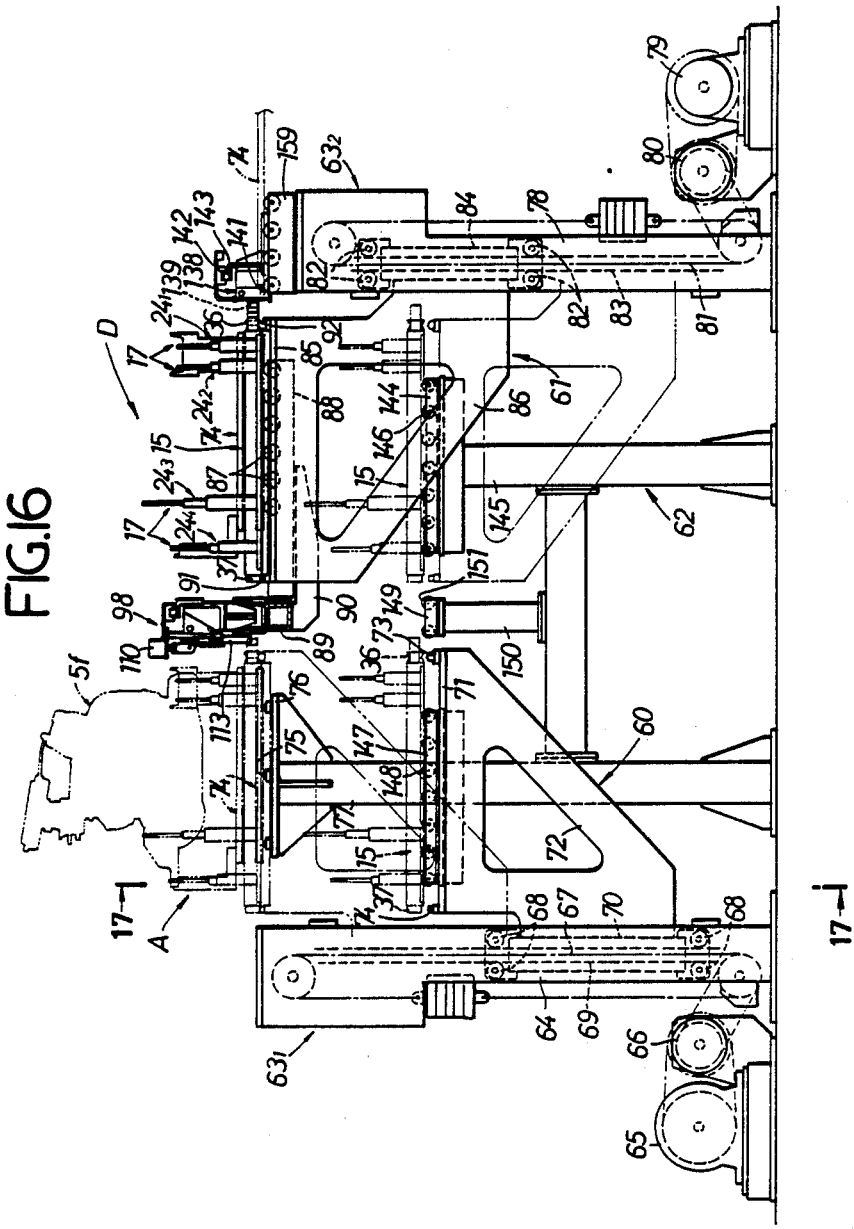

The separating mechanism 61 is constructed as follows:

As shown in FIGS. 1, 2A and 16, the separating mechanism 61 has a construction substantially similar to that of the superposing mechanism 60.

More specifically, a slider 84 is mounted on a pair of posts 78 of a portal or gate-type frame portion $63_2$ in the structural frame 62 and adapted to be raised and lowered along guide rails 83 of the posts 78 through a plurality of guide rollers 82 by means of a drive motor 79, a speed reduction device 80, a transmitting member 81 and the like. A horizontal pallet rest 85 having a U-shaped notch 85a with a side closer to the superposing mechanism 60 being opened is connected to the slider 84 through a pair of brackets 86 for raising and lowering movement in a horizontal attitude.

A pallet supporting stand 88 having a plurality of rollers 87 to support the work set pallet 14 is supported in a cantilever manner, through a bracket, on an upper traverse frame portion 89 of the structural frame 62 located between the first and third transport lines L1 and L3, so as to lie in a raising and lowering locus for the notch 85a in the pallet rest 85.

In the pallet rest 85, rail components 91a are load on upper surfaces of those ends of both opposed portions of the pallet rest 85 which are closer to the superposing mechanism 60, so as to lie on one dissymmetrical line parallel to the rails 73 and 74 of the superposing mechanism 60. A rail component 91b is laid on an upper surface of the pallet supporting stand 88 and located between both rail components 91a when the pallet rest 85 is in its raised position, so as to form a single rail 91 in cooperation with both rail components 91a. On the pallet rest 85, a rail 92 is also laid on an upper surface of a connecting portion for interconnecting both the opposed portions in parallel to the rail 91.

One rail 91 closer to the pallet superposing position A has a flat top surface, while the other rail 92 has an angled top surface, whereby the groove-free wheel 37 of the bolt set pallet 15 can roll on the one rail 91, while the grooved wheel 36 can roll on the other rail 92, both in positions above the pallet rest 85.

In the raised position of the pallet rest 85, the top surfaces of the rails 91 and 92 are located above the individual rollers 87 of the pallet supporting stand 88.

(i) First transport line L1

As clearly shown in FIGS. 1, 2A, 16 and 17, a pair of stationary rails 93 and 94 are laid on an upper surface of a rail supporting portion 95 of the structural frame 62 located between the pallet superposing position A and the part assembling position B and are located on extended lines of the rails 73 and 74 when the pallet rest 71 of the superposing mechanism 60 is in its raised position. A pair of movable rails 96 and 97 are also load on the lift table 49 of the lifter 12 for raising and lowering movement, so that they are located on extended lines of the stationary rails 93 and 94 when in their raised positions. The cross-sectional profiles of each of the stationary rails 93 and 94 and each of the movable rails 96 and 97 are identical with those of the rails of the pallet superposing mechanism 60.

A cylinder mechanism 98 for transporting the bolt set pallet 15 is mounted on the upper traverse frame portion 89 with its operations direction parallel to the stationary rails 93 and 94. The cylinder mechanism 98 is comprised of a first operating cylinder $100_1$ fixedly mounted on the upper traverse frame portion 89 in the vicinity of the one stationary rail 93 so that a leading end of a piston rod 99 may be extended sideways of the pallet superposing position A, and a rodless type second operating cylinder $100_2$ disposed above the first operating cylinder $100_1$ in parallel thereto and having a rail portion 101 slidably fitted in grooves in a pair of guide members 102 located on the upper traverse frame 89. In the second operating cylinder $100_2$, that end of a cylinder body 103 thereof which is closer to the pallet superposing position A is connected to the piston rod 99 of the first operating cylinder $100_1$ through a connecting fitting 104.

As clearly shown in FIGS. 18, 18A and 19, a holding plate 106 is connected to a piston 105 of the second operating cylinder $100_2$ and slidably carried on a pair of guide rods 107 for the cylinder body 103. The holding plate 106 is provided with a pair of parallel vertically extending guide rails 108 and a small-sized operating cylinder 110 having a piston rod faced downward to lie above and between the both guide rails 108. Both guide rails 108 are slidably fitted in a pair of guide grooves 112 provided in a back surface of a lift plate 111. An engagement pin 113 is also secured to the back surface of the lift plate 111 to project downward therefrom and is connected at its upper end to the piston rod 109 of the small-sized operating cylinder 110.

The engagement pin 113 can be raised and lowered by operation of the small-sized operating cylinder 110 for engagement with and disengagement from the first engaging portion $38_1$ of the bolt set pallet 15.

A guide rail 116 is mounted on the cylinder body 103 to extend in an axial direction of the cylinder body 103 and is slidably fitted in a guide groove 115 in a guide member 114 mounted on an upper end of the holding plate 106.

Figure 17:
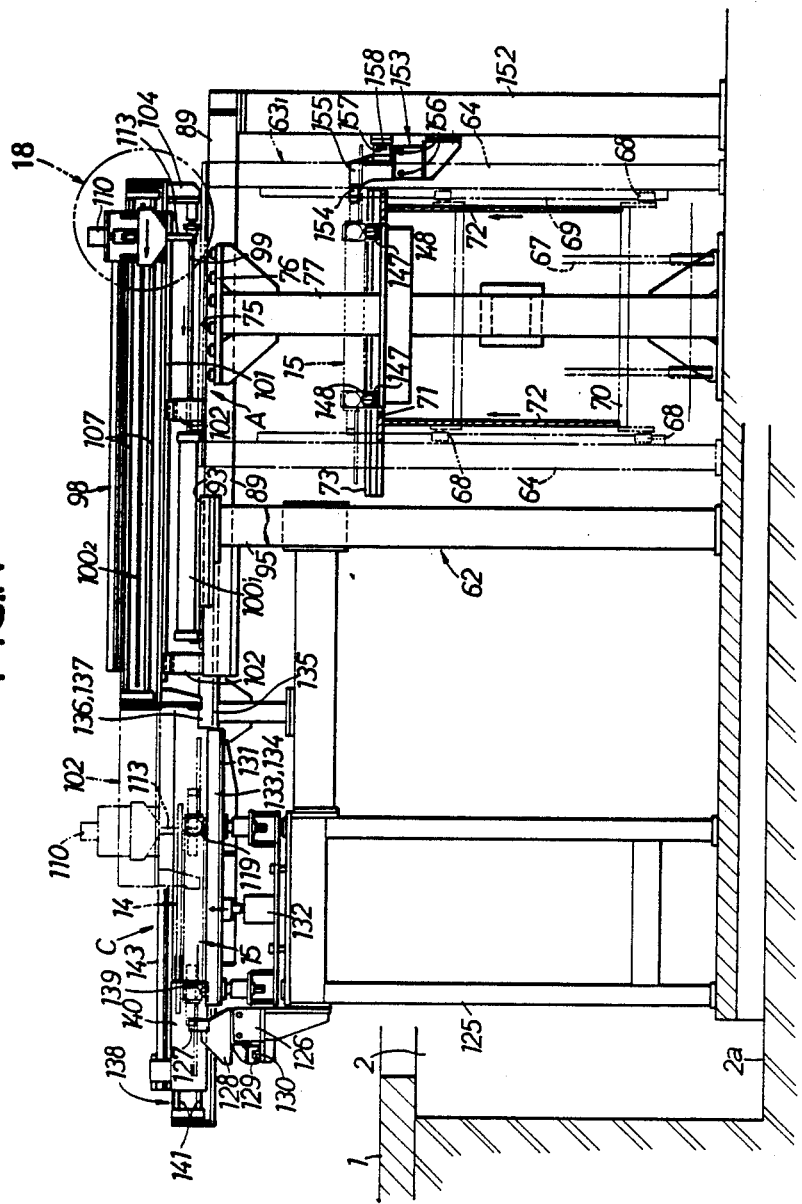

Referring to FIG. 17, the engagement pin 113 can be reciprocally moved between the pallet superposing position A and the part assembling position B by operation of the first and second operating cylinders $100_1$ and $100_2$.

(ii) Second transport line L2

As clearly shown in FIGS. 1, 2A, 17, 23 and 24, in the part assembling position B, a pair of rail members 117 are disposed on the lift table 49 of the lifter 12 and are located between the both movable rails 96 and 97 to extend in the lengthwise direction of the vehicle body. EAch of the rail members 117 includes a plurality of abacus bead-shaped rollers 118 each having a rotational axis parallel to the widthwise direction of the vehicle body. When each movable rail 96, 97 is in its lowered position, an upper outer peripheral edge of each of the rollers 118 projects above such movable rail 96, 97 to engage one of the angle guide grooves 41 in the bolt set pallet 15.

A pair of rail members 120 including a plurality of rollers 119 of the same shape as the rollers 118 are mounted in parallel to each other on a support frame portion 121 (FIG. 1) of the structural frame 62 so as to lie on extended lines of the individual rail members 117 in the pallet discharge position C, respectively.

Between the part assembling position B and the pallet discharge position C, a pair of short relay rail members 122 are mounted on a support frame portion 123 (FIG. 1) for connecting both of the rail members 117 and 120 and each include rollers 124 of the same shape as the aforesaid rollers 118.

As clearly mounted shown in FIG. 17, a rodless type operating cylinder 126 is mounted on a side of the support frame portion 125 in parallel to each rail member 120, and has a piston to which is connected a holding member 128 including an engagement element 127 engagible with the third engaging portion $38_2$ (FIG. 7) of the bolt set pallet 15. A guide rail 130 fixedly mounted on the support frame portion 25 is slidably received in a guide groove 129 in the holding member 128.

(iii) Third transport line L3

As clearly shown in FIG. 1, 2A and 17, a rail support 131 is mounted on an upper surface of the support frame portion 125 through a small-sized operating cylinder 132 for raising and lowering movement without interference with the two rail members 120. A pair of rails 133 and 134 are laid on an upper surface of the rail support 131 and adapted to be located on extended lines of the both rails 91 and 92 when the rail support 131 and the pallet rest 85 of the pallet separating mechanism D are in their raised position. In the raised position of the rail support 131, respective upper surface of the individual rails 133 and 134 lie above each roller 119 in each rail member 120.

A pair of stationary rails 136 and 137 are laid on an upper surface of a rail support 135 of the structural frame 62 located between the pallet discharge position C and the pallet separating position D for connecting the rails 91, 92 and the rails 133, 134 respectively when the rail support 131 and the pallet rest 85 are in their raised positions.

The cross-sectional profile of the individual rails 133, 134 and the stationary rails 136, 137 is the same as that of the individual stationary rails 91, 92 of the separating mechanism 61.

As clearly shown in FIGS. 16 and 17, a rodless type operating cylinder 138 is mounted in parallel to one of the stationary rail 137 between the support frame portion 125 and the portal frame portion $63_2$ of the separating mechanism 61 and has a piston to which is connected a holding member 140 including an engagement element 139 engagible with the second engaging portion $38_3$ (FIG. 7) of the bolt set pallet 15. The holding member 140 is slidably carried on a pair of guide rods 141, and a guide rail 143 mounted on the operating cylinder 138 is slidably received in a guide groove 142 in the holding member 140.

(iv) Fourth transport line L4

As shown in FIGS. 1, 2A, 16 and 17, a pair of parallel rail members 144 extending in the lengthwise direction of the vehicle body are mounted on a support frame portion below the pallet supporting stand 88 so as to lie in a locus of raising and lowering of the notch 85a in the pallet rest 85 in the pallet separating position D. Each of the rail members 144 includes a plurality of abacus bead-shaped rollers 146 having rotational axis parallel to the widthwise direction of the vehicle body. In the lowered position of the pallet rest 85, each roller 146 projects above each rail 91, 92 to engage one of the angle guide grooves 41 in the bolt set pallet 15.

A pair of rail members 147 are mounted on the support frame portion 77 below the pallet supporting stand 76 and are located in the locus of raising and lowering movements of the opening 71a of the pallet placing rest 71 in the pallet superposing position A and also on extended lines of the corresponding rail members 144 in the pallet separating position D. Each of the rail members 147 includes a plurality of abacus bead-shaped rollers 148 each having a rotational axis parallel to the widthwise direction of the vehicle body, each roller being adapted to project above the individual rails 73 and 74 in the lowered position of the pallet placing rest 71 to engage the corresponding angle guide groove 41 in the bolt set pallet 15.

Between the pallet separating position D and the pallet superposing position A, a pair of short relay rail members 149 are mounted on a support frame portion 150 for connecting the rail members 144 and 147 and each include rollers 151 of the same shape as the above-described rollers.

In the pallet separating position D, a rodless type operating cylinder 153 is mounted in parallel to the rail member 144 on the portal frame portion $63_2$ and a support frame portion 152 and has a piston to which is connected a holding member 155 including an engagement element 154 engagible with the fourth engaging portion $38_4$ (FIG. 7) of the bolt set pallet 15. The holding member 155 is slidably carried on a pair of guide rods 156. A guide rail 158 laid on the portal frame portion $63_2$ and the support frame portion 152 is slidably received in a guide groove 157 of the holding member 155.

(v) Transportation of bolt set pallet 14 and the like through first to fourth transport lines L1 to L4

In the pallet superposing position A, the work set pallet 14 with the front bottom part $5f$ carried thereon stands by on the pallet supporting stand 76.

The bolt set pallet 15 with the bolts 17 carried thereon is placed onto the pallet rest 71 with the individual grooved wheels 36 and groove-free wheels 37 put on the corresponding rails 73 and 74. The raising of the pallet rest 71 causes the bolt set pallet 15 to be superposed onto the work set pallet 14 from below the latter. In the raised position of the pallet rest 71, the lower surface of the bolt set pallet 15 lies above the individual steel balls 75 of the pallet supporting stand 76.

Operation of the small-sized operating cylinder 110 causes the engagement pin 113 to be lowered to engage the first engage portion $38_1$ (FIG. 7) of the bolt set pallet 15.

Each rail 96, 97 in the part assembling position B assumes the raised position and therefore, the operation of the second operating cylinder $100_2$ following the operation of the first operating cylinder $100_1$ causes the bolt set pallet 15 to be transported along the individual rails 73, 74, the individual stationary rails 93, 94 and the individual movable rails 96, 97 into the part assembling position B.

Prior to starting of the assembling operating for the front bottom part $5f$, the individual rails 96 and 97 are lowered, thereby causing the bolt set pallet 15 to be lowered, so that each angle guide groove 41 engages the roller 118 of each rail member 117.

In this state, the lifter 12 is operated to raise the bolt set pallet 15 and thus the front bottom part $5f$ for assembling thereof.

After assembling, lowering of the bolt set pallet 15 results in the engagement element 127 of the second transport line L2 engaging the third engaging portion $38_2$ (FIG. 7) of the bolt set pallet 15.

Because the individual rails 133 and 134 in the pallet discharge position C are in their lowered position, the operation of the operating cylinder 126 causes the bolt set pallet 15 and the work set pallet 14 to be transported along the individual rails 117, the individual relay rail members 122 and 122 and the individual rail member 120 into the pallet discharge position C.

The small-sized operating cylinder 132 is actuated to raise the individual rails 133 and 134, so that the grooved wheels 36 and the groove-free wheels 37 are placed onto the corresponding rails 133 and 134, and the second engaging portion $38_3$ (FIG. 7) of the bolt set pallet 15 engages the engagement element 139.

The pallet rest 5 in the pallet separating position D is in its raised position and hence, the operation of the operating cylinder 138 causes the bolt set pallet 15 and the work set pallet 14 to be transported along the rails 133 and 134, the stationary rails 136 and 137, and the rails 91 and 92 into the pallet separating position D.

Lowering of the pallet rest 85 causes the work set pallet 14 to be placed onto the pallet supporting stand 88, while lowering the bolt set pallet 15, so that each angled guide groove 41 engages the corresponding one of the rail members 144. In addition, the fourth engaging portion $38_4$ (FIG. 7) of the bolt set pallet 15 also engages the engagement element 154.

The work set pallet 14 is transported from the pallet supported stand 88 through a roller conveyer 159 on the portal frame portion $63_2$ and through the fifth transport line L5 and placed again onto the pallet supporting stand 76 in the pallet superposing position A.

In the pallet superposing position A, the pallet rest 71 is in its lowered position and therefore, the operation of the operating cylinder 153 causes the bolt set pallet 15 to be transported along the rail members 144, the relay rail members 149 and the rail members 147 into the pallet superposing position A.

Raising of the pallet rest 71 results in the grooved wheels 36 and the groove-free wheels 37 being placed onto the corresponding rails 73 and 74, and then, the bolt set pallet 15 is superposed onto the work set pallet 14 standing by on the pallet supporting stand 76 in the same manner as described above.

III. Lifter 12

Figure 20:
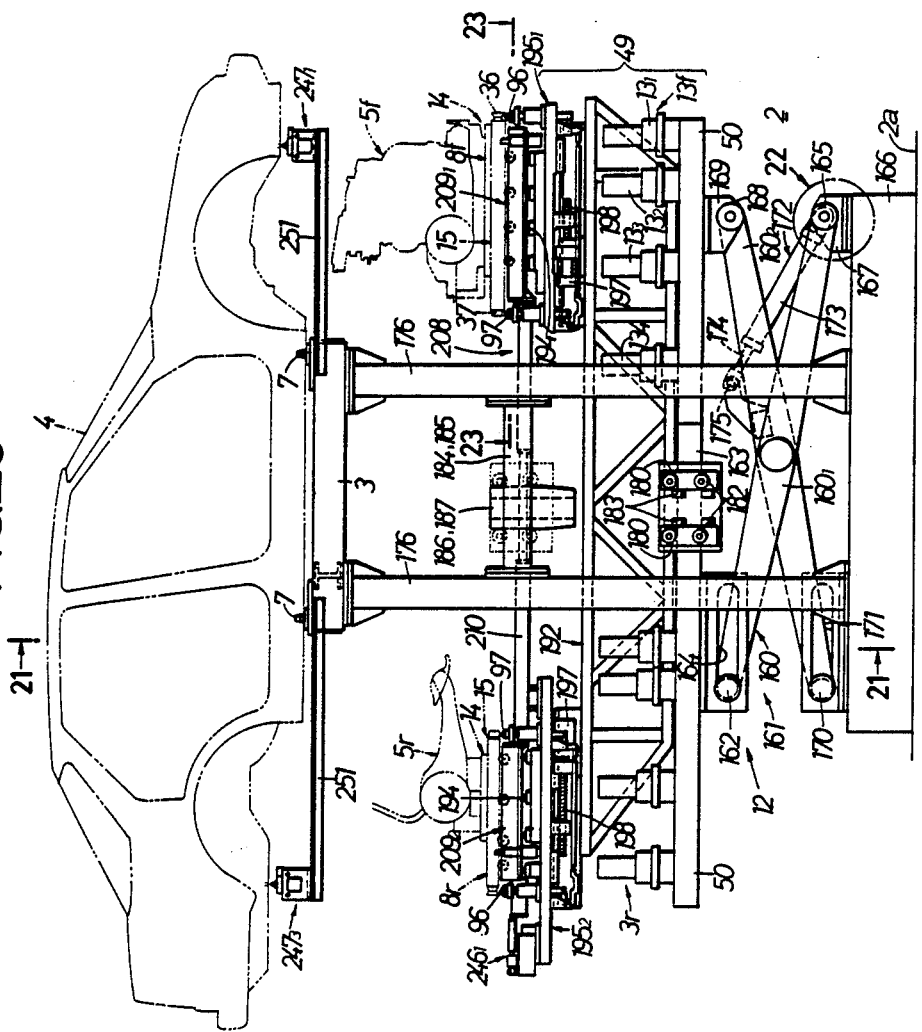
Figure 21:
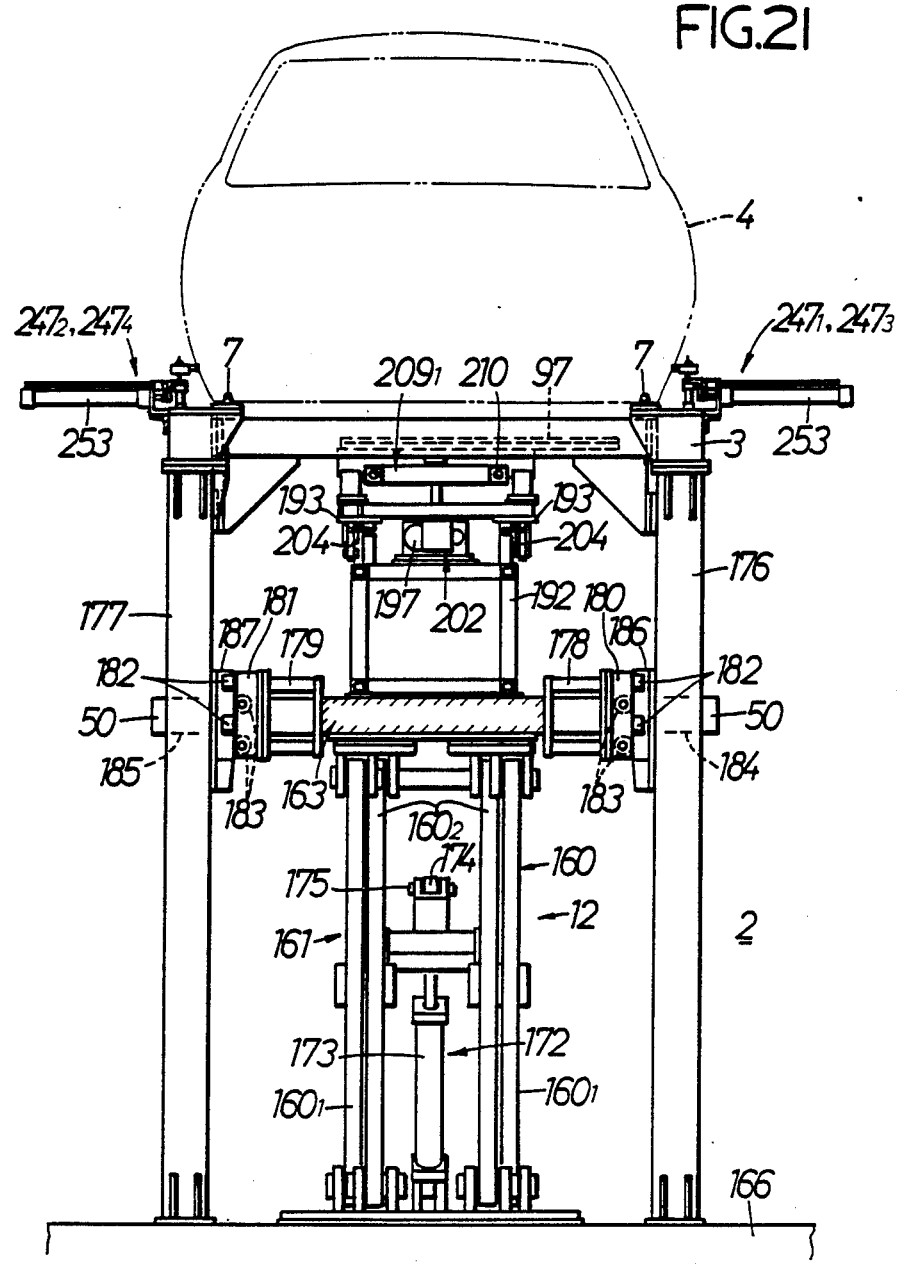

As shown in FIGS. 20 and 21, a lifting mechanism 161 having an X-type link 160 is disposed on the bottom $2a$ of the pit 2. The lift table 49 is carried on the lifting mechanism 161.

A roller 162 located at an upper end of first one $160_1$ of link members forming the X-type link 160 is rollably received in a horizontal elongated hole 164 provided in a base plate 163 (FIG. 21), of the lift table 49, having the rest 50. A pivotal point 165 located at a lower end of the first link $160_1$, is rotatably carried in a support portion 167 on an upper surface of a base 166 placed on the bottom $2a$ of the pit 2. A pivotal point located at an upper end of the other, second link member $160_2$ is rotatable carried in a support portion 169 on a lower surface of the base plate 163 above the pivotal point 165 of the first link member $160_1$. A roller 170 located at a lower end of the second link member $160_2$ is rollably received in a horizontal elongated hole 171 provided in the upper surface of the base 166.

A cylinder body 173 of an operating cylinder 172 is pivotally supported between the pivotal points 165 of the first link member $160_1$. A leading end of a piston rod 174 of the operating cylinder 172 is pivotally connected to an intermediate portion of the second link members $160_2$. Thus, as the piston rod 174 of the operating cylinder 172 is extended, the lift table 49 is raised, whereas as the piston rod 174 is retracted, the lift table 49 is lowered.

As shown in FIGS. 2A, 20 and 21, the support base 3 on which the vehicle body 4 is positioned and fixed is supported on a set of two support legs 176 and 177 extending upwardly from the base 166 below the opposite left and right sides of the vehicle body 4.

A pair of front and rear brackets 178 and 179 extending in the widthwise direction of the vehicle body are mounted on the base plate 163 of the lift table 49, respectively at points between the corresponding pairs of the support legs 176 and 177. Guide rails 182 and 183 are mounted in the following manner on rectangular block 180 and 181 located at leading ends of the brackets 178 and 179.

The relationship of guide rollers 182 and 183 and their mounting is the same on opposite left and right sides of the vehicle body 4 and hence, only the guide rollers on the right side of the vehicle body 4 will be described below. The two guide rollers 182 each having a rotational axis directed in the widthwise direction of the vehicle body are mounted at vertically spaced apart points on an outer surface of each of the rectangular blocks 180. The two guide rollers 183 each having a rotational axis directed in the lengthwise direction for the vehicle body are mounted at vertically spaced apart points on the opposite surface of each of the rectangular blocks 180.

Transverse members 184 and 185 are positioned between intermediate portions of the both support legs 176 and 177 located on the opposite sides of the vehicle body 4, respectively. Locating blocks 186 and 187 are secured to the opposed surfaces of the transverse members 184 and 185, respectively.

As clearly shown in FIG. 20, in the lowered position of the lift table 49, the individual guide rollers 182 and 183 are spaced apart from the blocks 186 and 187. On the other hand, as clearly shown in FIG. 21, as the lift table 49 is raised, the individual guide rollers 182 engage those end faces of the locating blocks 186 and 187 which are in the longitudinal direction of the vehicle body 4, while the other individual guide rollers 183 engage the opposed faces of the locating blocks 186 and 187. This prevents the lift table 49 from oscillating in longitudinal and lateral directions of the vehicle body 4.

Figure 22:
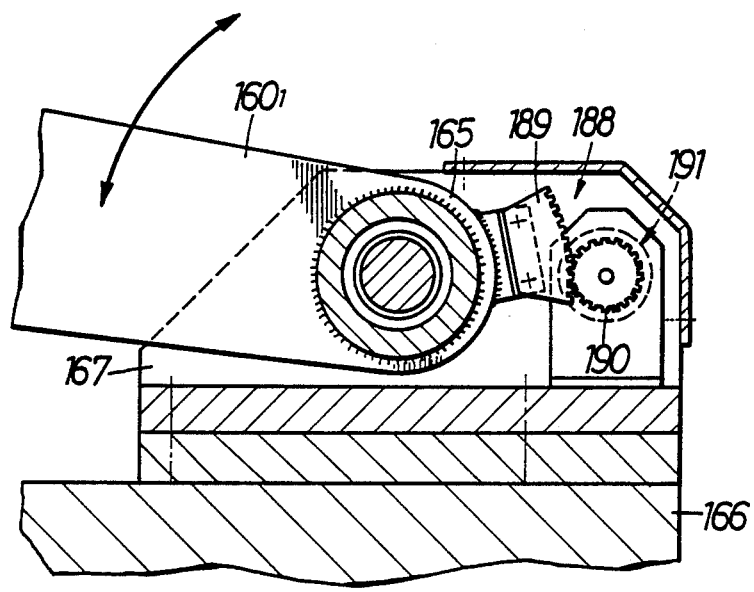

As shown in FIG. 22, a detecting mechanism 188 is mounted at the pivotal point 165 located at the lower end of the first link member 160 for converting the pivotal angle of the pivotal point 165 into an indication of a level of the lift table 49.

The detecting mechanism 188 is comprised of a sector gear 189 mounted on the pivotal point 165, and an encoder 191 fixedly mounted on the base 166 and having a gear 190 meshed with the sector gear 189. The encoder 191 is adapted to intermittently generate pluses, when the gear 190 is turned with turning of the sector gear 189, so that addition of the number of such pulses provides a level of the lift table 49.

With such an arrangement, the pivotal points 165 of the X-type link 160 oscillate less and therefore, it is possible to accurately detect the level of the lift table 49 by the detecting mechanism 188.

The lift table 49 is constructed as described below. Because it is constructed in a similar manner below the front and rear sides of the vehicle body 4, only the front side will be described below.

As clearly shown in FIGS. 20, 21 and 23 to 27, a support member 192 having a length substantially equal to that of the vehicle body is disposed on the upper surface of the base plate 163. A pair of front parallel guide rails 193 extending in the lengthwise direction of the vehicle body are laid on an upper surface of a front portion of the support member 192. A guide portion 196 on a lower surface of a front support base $195_1$ is slidably fitted over the front guide rail 193. The front support base $195_1$ is provided with a plurality of steel balls 194 arranged thereon in two rows in an exposed manner in the lengthwise direction of the vehicle body, As clearly shown in FIGS. 24 and 26, a servo motor 197 is disposed on the upper surface of the support member 192 below the front support base $195_1$. A threaded shaft 198 turned by the servo motor 197 extends in the lengthwise direction of the vehilce body and is threadedly meshed with an internally threaded member 199 mounted on a lower surface of the front support base $195_1$. This enables operation of the servo motor 197 to provide the advancing and retreating movements of the front support base $195_1$ along the both guide rails 193 in the lengthwise direction of the vehicle body.

Figure 23:
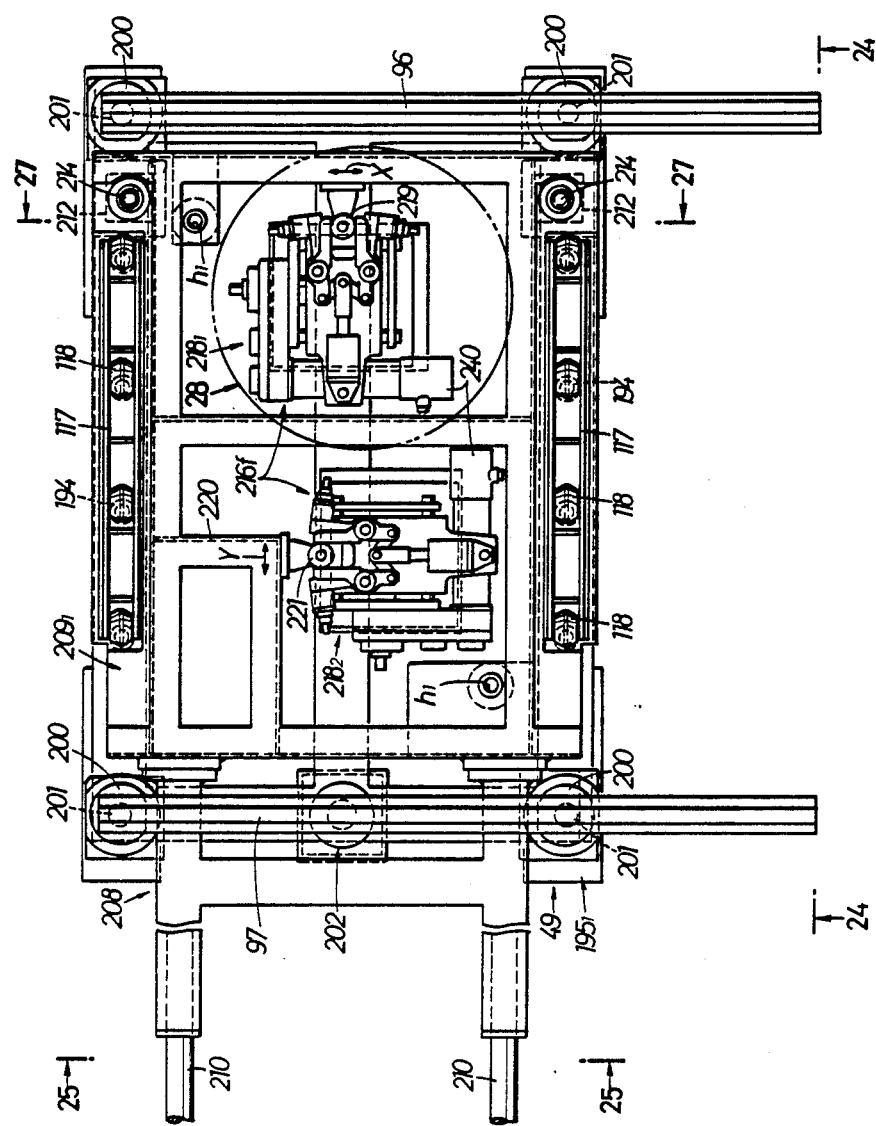

As clearly shown in FIG. 23, a support tube 200 is mounted on the upper surface of the front support base $195_1$ at each of its four corners. A rail support rod 201 is vertically slidably supported in each of the support tubes 200 and the movable rails 96 and 97 are supported on the corresponding pairs of the rail support rods 201 located on the front and rear sides in the lengthwise direction of the vehicle body, respectively.

Figure 25:
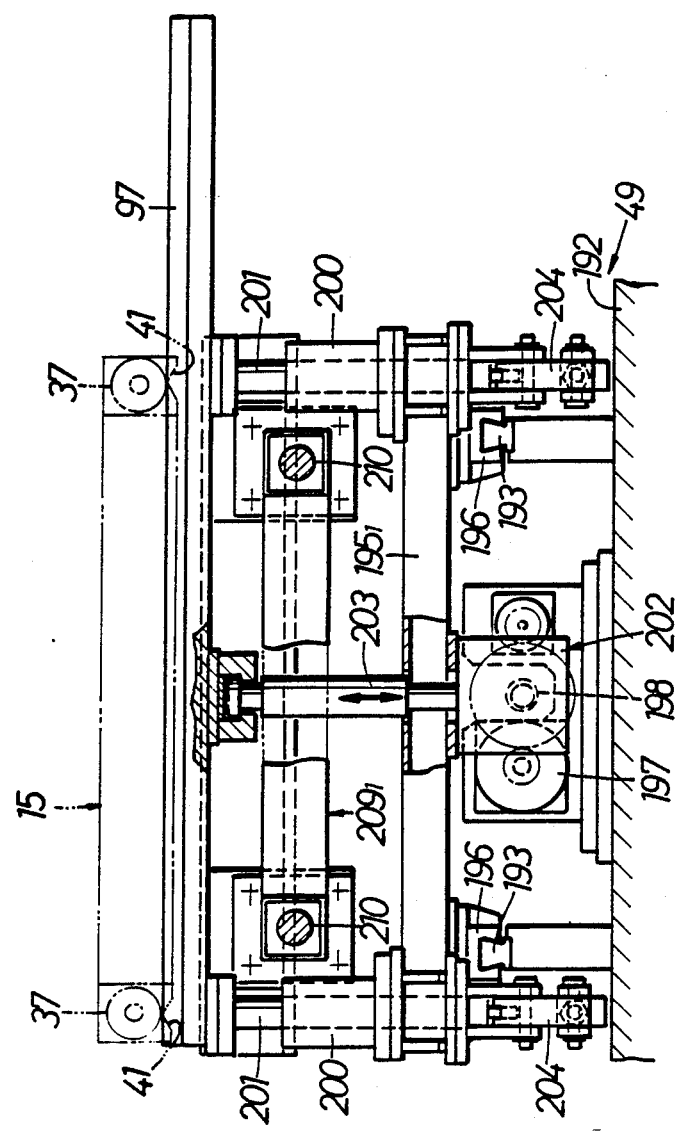
Figure 26:
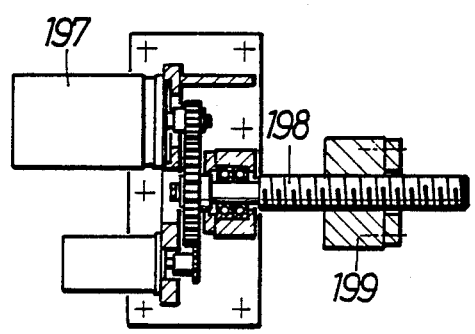

As clearly shown in FIG. 25, between the both rail support rods 201 located on the rear side in the lengthwise direction of the vehicle body, an operating cylinder 202 is securely mounted on the front support base $195_1$, so that a leading end of an upward extending piston 203 thereof abuts against the lower surface of the one movable rail 97.

As clearly shown in FIGS. 24 and 25, on the opposite sides of the front support base $195_1$ which are parallel to the lengthwise direction of the vehicle body, a pair of front and rear bell-cranks 204 are pivotally mounted on the lower surface of the front support base $195_1$. A roller 205 located at an upper end of one arm of each of the bell-cranks 204 is rollably received in a hole 206 in a lower end of each rail support rod 201. Opposite ends of a connecting rod 207 are pivotally connected to lower ends of the other arm of the front and rear bell-cranks 204, respectively.

With such an arrangement, if the operating cylinder 202 is actuated, both movable rails 96 and 97 can be concurrently raised and lowered through the corresponding pairs of the bell-cranks 204 and the corresponding connecting rods 207.

IV. Placing rest 208 for pallet members

Referring to FIGS. 20, 23 to 25 and 27, a placing rest 208 on which the front and rear pallet members 8f and 8r are placed is disposed on the lift table 49 to extend over the part assembling positions B for the front and rear portions of the vehicle body 4. The placing rest 208 comprises first and second placing portions $209_1$ and $209_2$ in the form of rectangular frames, which are movably supported on the steel balls 194 for the front and rear support bases $195_1$ and $195_2$ between the both movable rails 96 and 97, as clearly shown in FIG. 20 and a pair of parallel telescopic type connecting rods 210 extending in the lengthwise direction of the vehicle body to connect the opposed surfaces of the placing portions $209_1$ and $209_2$. The above-described rail members 117 are mounted on the placing portions $209_1$ and $209_2$, so that the front and rear pallet members 8f and 8r are placed onto the placing rests $209_1$ and $209_2$ with the rollers 118 of the rail members 117 engaged in the angled guide grooves 41 in the bolt set pallet 15.

Figure 27:
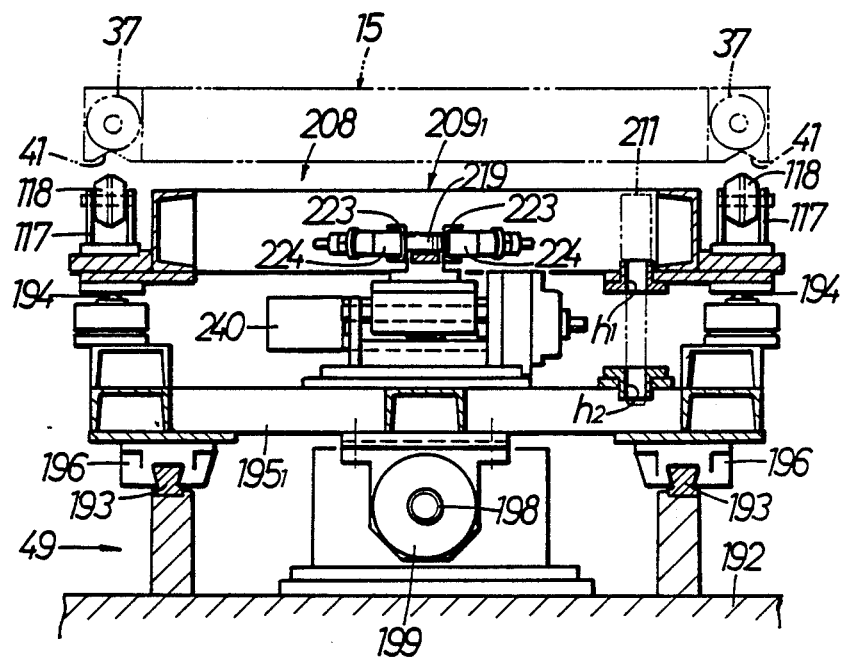
Figure 28:
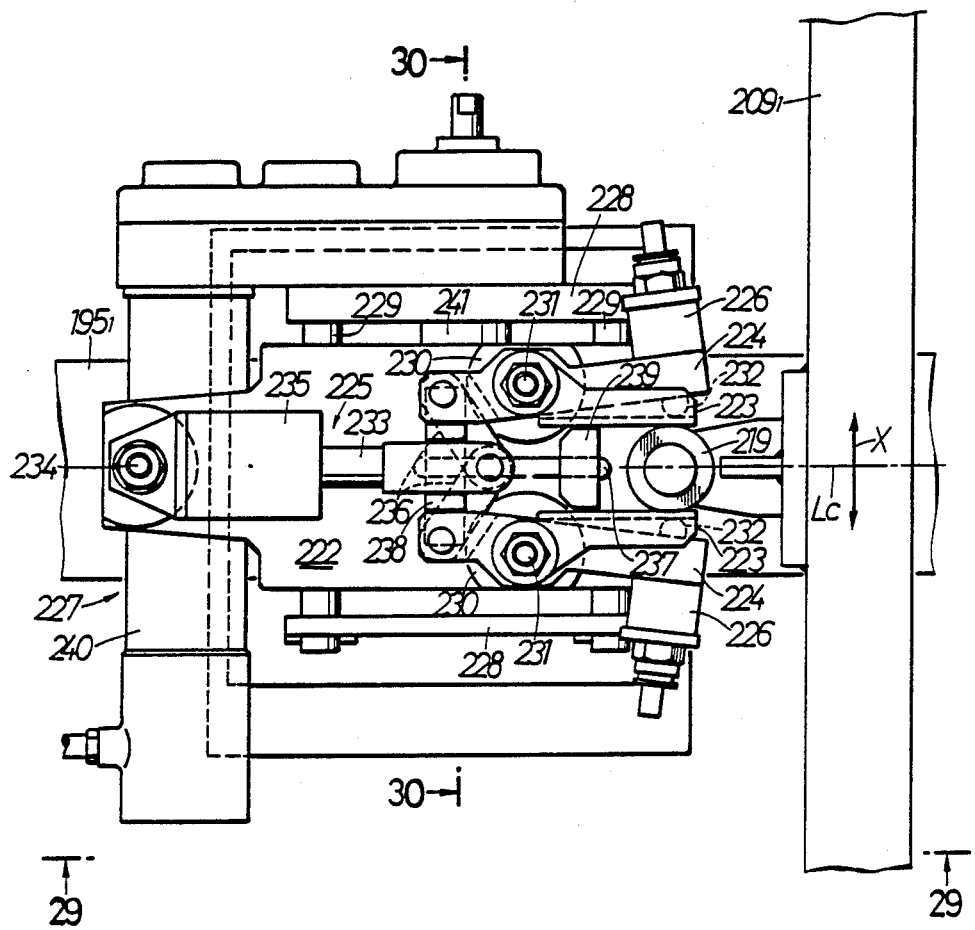
Figure 29:
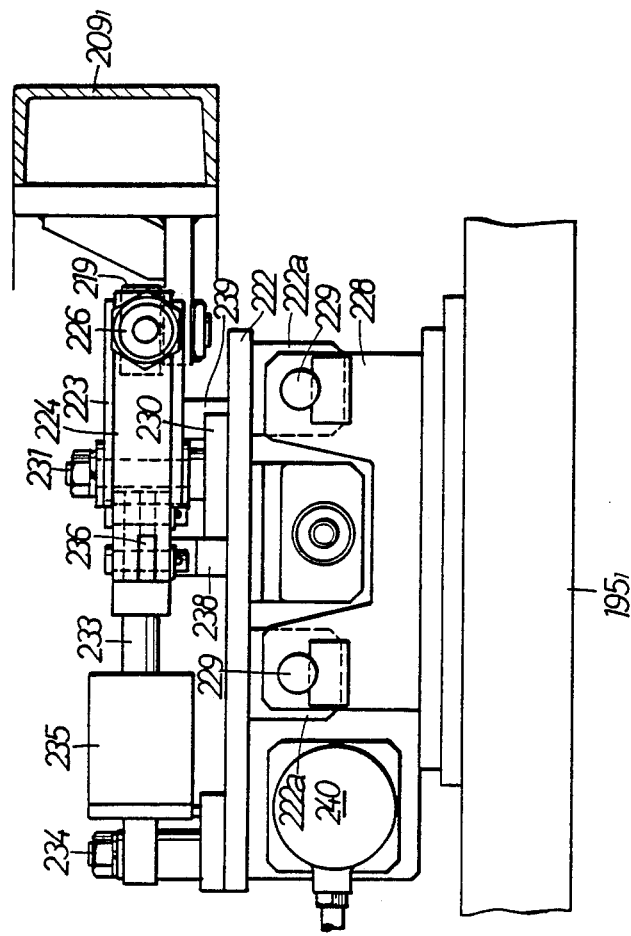
Figure 30:
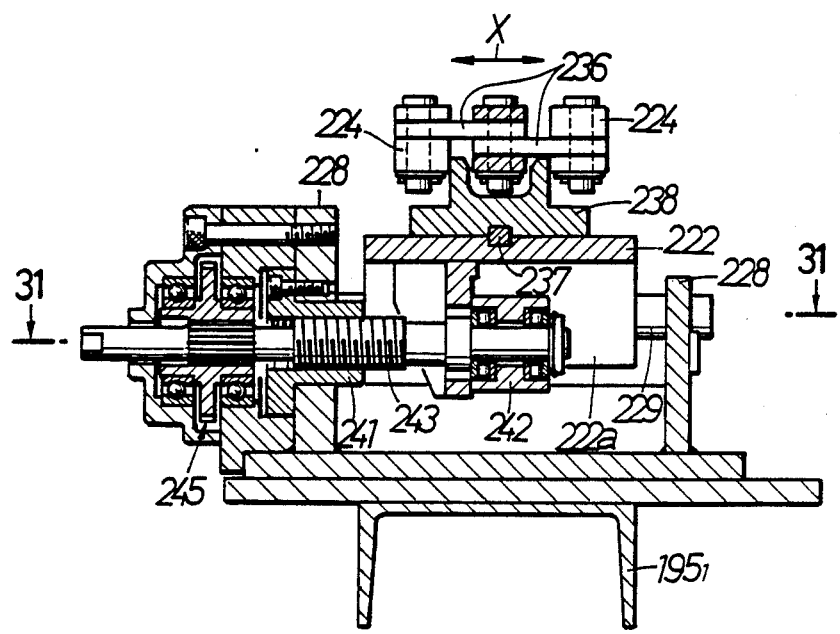
Figure 31:
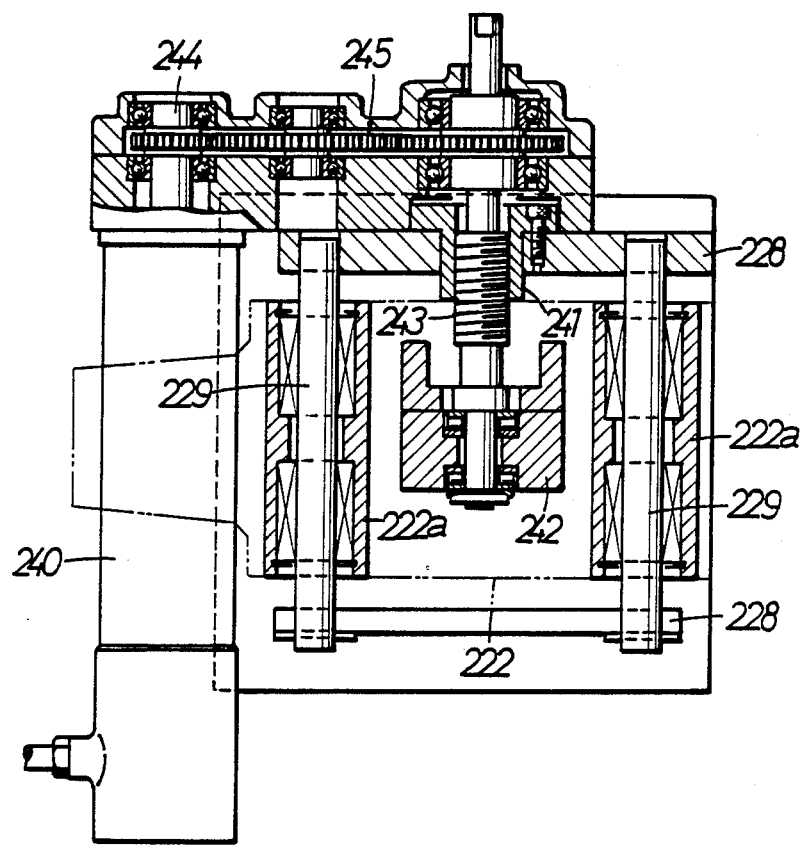
Figure 32:
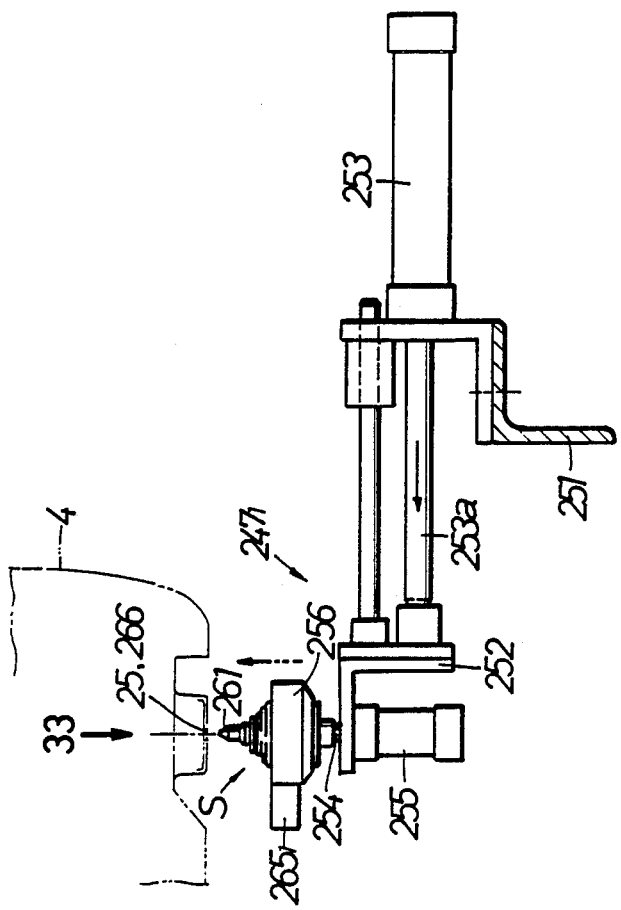

As clearly shown in FIGS. 23 and 27, the first placing portion $209_1$ and the front supporting base $195_1$ are coupled with each other by inserting coupling pins 211 into pairs of through holes $h_1$ and $h_2$ disposed on respective diagonal lines of the first placing portion $209_1$ and the front supporting base $195_1$. The second placing portion $209_2$ is coupled with the rear support base $195_1$ in a similar manner by coupling pins into through holes (not shown).

Referring to FIG. 20, if individual servo motors 197 below the front and rear support bases $195_1$ and $195_2$ are driven to turn the threaded shafts 198, the distance between the first and second placing portions $209_1$ and $209_2$ can be changed through the front and rear supports $195_1$ and $195_2$. Therefore, in changing of the model or type of vehicle, it is possible to easily accommodate a change in wheel base.

After changing of wheel base, each pin 211 may be removed to release the coupling between the first placing portion $209_1$ and the front support base $195_1$ as well as the coupling between the second placing portion $209_2$ and the rear support base $195_2$.

As clearly shown in FIGS. 23 and 24, on the front side of the first placing portion $209_1$ as viewed in the lengthwise direction of the vehicle body, a small-sized operating cylinder 212 is mounted on each of lower surfaces on the opposite sides thereof. A locating pin 214 connected to an upward-pointing piston rod 213 of each of the operating cylinders 212 penetrates a through hole 215 made in the first placing portion $209_1$.

With the above arrangement, when the bolt set pallet 15 has been transported into the part assembling position B, each locating pin 214 assumes the lowered position, and each movable rail 96, 97 assumes the raised position and thus, the grooved wheels 36 and the groove-free wheels 37 are rolled on the movable rails 96 and 97. Then, as the movable rails 96 and 97 are lowered, the bolt set pallet 15 is also lowered, so that each angled guide groove 41 engages the roller 118 of each rail member 117, and the operation of each small-sized operating cylinder 212 causes each locating pin 214 to be fitted into the corresponding one of the locating holes 40 in the bolt set pallet 15. This provides the locating of the bolt set pallet 15 and thus the front bottom part $5f$ relative to the first placing portion $209_1$.

It should be noted that small-sized operating cylinders and the like are also mounted on the side of the second placing portion $209_2$.

If the first and second placing portions $209_1$ and $209_2$ are connected by the connecting rod 210 as described above, it is possible to provide a good alignment between the front and rear bottom parts $5f$ and $5r$, even if the front and rear pallet members $8f$ and $8r$ are divided longitudinally.

V. Arrangement or adjusting the positions of front and rear bottom parts $5f$ and $5r$ relative to vehicle body 4

As shown in FIGS. 2A, 23 and 27 to 34, the position-adjusting arrangement comprises front and rear mechanisms $216f$ and $216r$ for displacing the placing rest 208, which are connected to the first and second placing portions $209_1$ and $209_2$ of the placing rest 208, so that the placing portions have a predetermined amount of floating movement, and a correcting mechanism 217 adapted to detect the misregister or misalignment of the vehicle body 4 and to operate the front and rear displacing mechanisms $216f$ and $216r$ in response to the amount of misregister exceeding the aforesaid amount of floating.

(i) Front and rear displacing mechanisms $216f$ and $216r$

The front and rear displacing mechanisms $216f$ and $216r$ have the same construction and hence, only the front displacing mechanism $216f$ will be described below with reference to FIGS. 23 and 27 to 31.

On the upper surface of the support base $195_1$ at that place surrounded by the first placing portion $209_1$ there are disposed a first mechanism portion $218_1$ for displacing the first placing portion $209_1$ in the widthwise direction X of the vehicle body and a second mechanism portion $218_2$ for displacing the first placing portion $209_1$ in the lengthwise direction Y of the vehicle body. A roller 219 connected to the first mechanism portion $218_1$ is supported for rotation about a vertical axis on a front and inner surface of the first placing portion $209_1$ as viewed in the lengthwise direction of the vehicle body. A roller 221 connected to the second mechanism portion $218_2$ is supported for rotation about a vertical axis on a support member 220 mounted on the first placing portion $209_1$ to project inward therefrom.

The first mechanism $218_1$ comprises a slide table 222 movable in the widthwise direction X about the front support base $195_1$, a pair of grasping members 223 pivotally supported on the slide table 222 grasp the roller 219 from the opposite sides. A pair of urging members 224 are disposed to sandwich each grasping member 223 and are pivotally supported on the slide table 222 in a coaxial relation to each grasping member 223. Operating means 225 mounted on the slide table 222 concurrently operate the individual urging members 224. An actuator 226 is mounted at a leading end of each of the urging members 224 to bias the grasping member 223 toward the roller 219. Drive means 227 are provided for moving the slide table 222 in the widthwise direction S.

A pair of side plates 228 opposed to each other at a distance in the widthwise direction are mounted on the support base $195_1$ to rise thereon. A pair of guide rods 229 extending in the widthwise direction X are horizontally laid between both the side plates 228. A pair of guides $222a$ are mounted in projection on a lower surface of the slide table 222. The guide rods 229 are slidably inserted through the corresponding guides $222a$. This enables the slide table 222 to be guided by both guide rods 229 to move in the widthwise direction X.

On the opposite sides between which there is a center line Lc extending through the axis of the roller 219 in parallel to the widthwise direction, supporting members 230 are secured on portions of the slide table 222 closer to the roller 219. The grasping members 223 are pivotally supported at their base ends on corresponding stub shafts 231 extending upwardly from the support member 220, respectively. Each of the grasping members 223 is formed into a substantially U-shaped cross-sectional profile opened on the opposite side from the roller 219 (FIG. 27). The urging member 224 fitted to each grasping member 223 is pivotally supported at its middle portion on the stub shaft 231.

Each of the actuators 226 serves to pneumatically bias an urging element 232 having a favored spherical end protruding toward the grasping member 223, whereby the both grasping members 223 are urged to swing in a direction to grasp the roller 219.

The operating means 225 includes an operating cylinder 235 having a piston rod 233 extending in the lengthwise direction Y and is pivoted at 234 on the slide table 222. A pair of links 236 connect a leading end of the piston rod 233 and a base end of each urging member 224.

Thus, if the piston rod 233 of the operating cylinder 235 is extended, the urging members 224 are swung or turned in such a direction that their leading ends are moved away from the roller 219. If the piston rod 233 is retracted, the urging members 224 are swung or turned in such a direction that their leading ends approach each other, i.e., the roller 219 is grasped by the urging members through the actuators 226.

A key 237 is disposed o the slide table 22 to extend along the above-described center line Lc. A pair of restricting members 238 and 239 whose positions in the widthwise direction may be determined by the key 237 are secured on the slide table 222. One of the restricting members 238 is capable of abutting against the base ends of the both urging members 224 and defines the minimum spacing between the base ends of the both urging members 224, i.e., the maximum spacing between the leading ends of them. The other restricting member 239 is capable of abutting against the both grasping members 223 and defines the minimum spacing between the both grasping members 223.

The drive means 227 includes a servo motor 240 having an axis extending in the widthwise direction X and fixedly mounted on the front support base $195_1$. A nut member 241 having an axis extending in the widthwise direction X is fixedly mounted on one of the side plates 228. A ball threaded-shaft 243 is threadedly inserted in the nut member 241 and is rotatable connected at one end thereof to a connection 242 on a lower surface of the slide table 22. A gear train 245 transmits a rotational force of an output shaft 244 of the servo motor 240 to the ball threaded shaft 243. Thus, if the ball threaded shaft 243 is rotated or reversed by the servo motor 240, the slide table 222 and thus the first placing portion $209_1$ can be moved in the widthwise direction X.

The second mechanism portion $218_2$ basically has the same construction as the above-described first mechanism portion $218_1$ and hence, the detailed description thereof is omitted, but it will be understood that the second mechanism portion $218_2$ enables the first placing portion $209_1$ to be moved in the lengthwise direction Y.

With the above arrangement, for example, in regard to the first mechanism portion $218_1$, the piston rod 233 is retracted by the operating cylinder 235, the piston rod 233 is retracted by the operating cylinder 235 to swing both urging members 224. With the roller 219 strongly grasped by both grasping members 223, the servo motor 240 is operated to move the slide table 222 and thus the first placing portion $209_1$ in the widthwise direction X for positioning thereof.

At the point of completion of this positioning, the operating cylinder 235 has the piston rod 233 extended to bring both urging members 224 back to the original position. At this time, the grasping members 223 are biased by only the actuators 226 at the leading ends of the urging members in a direction to grasp the roller 219. Hence, it is possible for the first placing portion $209_1$ to have a predetermined amount of movement in the widthwise direction X.

Therefore, the first mechanism $218_1$ is connected to the first placing portion $209_1$, so that the first placing portion $209_1$ has predetermined floating amount in the widthwise direction X.

The second mechanism $218_2$ is connected to the first placing portion $209_1$, so that the first placing portion $209_1$ also has a predetermined floating amount in the lengthwise direction Y.

In the rear displacing mechanism 216r, the relationship of connection between the first and second mechanism portions $246_1$ and $246_2$ and the second placing portion $209_2$ corresponds to that in the above-described front side.

(ii) Correcting mechanism 217

As shown in FIG. 3, the correcting mechanism 217 comprises first to fourth sensor units $247_1$ to $247_4$ disposed on the front and rear, opposite sides of the vehicle body 4, and a comparator 248 for comparing, upon reception of signals of misregister amounts for the vehicle body 4 from the individual sensor units $247_1$ to $247_4$, the individual misregister amounts whether or not they are less than the floating amount of the first and second placing portions $209_1$ and $209_2$. The comparator 248 is designed to deliver an operating signal to a servo motor controller 249 for operating the servo motor 240, when the aforesaid misregister amount exceeds the floating amount, and to deliver an operating signal to a lifting-mechanism controller 250 for raising the lifting mechanism 161, when the misregister amount is less than the floating amount The sensor units $247_1$ to $247_4$ have the same structure and are constructed as follows:

Referring to FIGS. 2A, 3, 20, 21 and 32 to 34, four stays 251 are secured at base ends thereof to the support base 3 for positioning and fixing the vehicle body 4 and extend along lower portions of edges on the opposite left and right sides of the vehicle body 4 and in the longitudinal direction of the vehicle body. As clearly shown in FIG. 32, at the front and rear sides of the vehicle body 4, the individual pairs of stays 251 are provided at their leading ends with operating cylinders 253 having piston rods 253a extending in the widthwise direction of the vehicle body with their leading ends opposed to each other. A small-sized operating cylinder 255 having a piston rod 254 with its leading end upward is provided at the leading end of each of the piston rod 253a through a bracket 252.

A sensor S as described in the following is supported on the leading end of the piston rod 254 of each small-sized operating cylinder 255.

Figure 33:
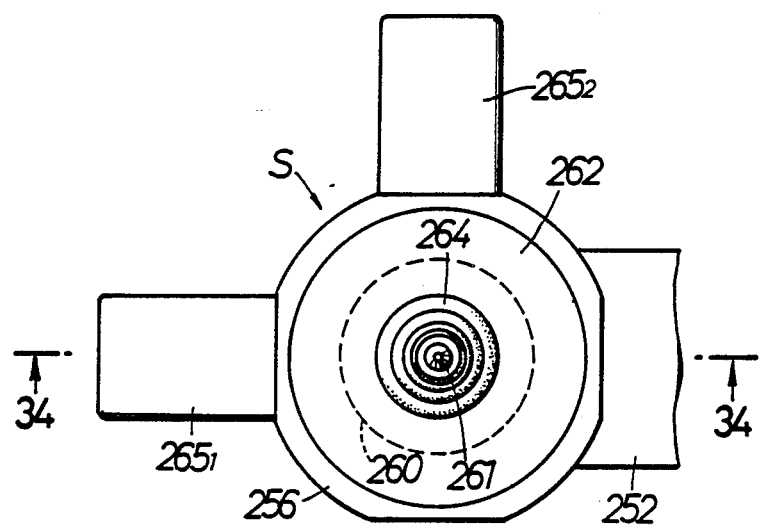
Figure 34:
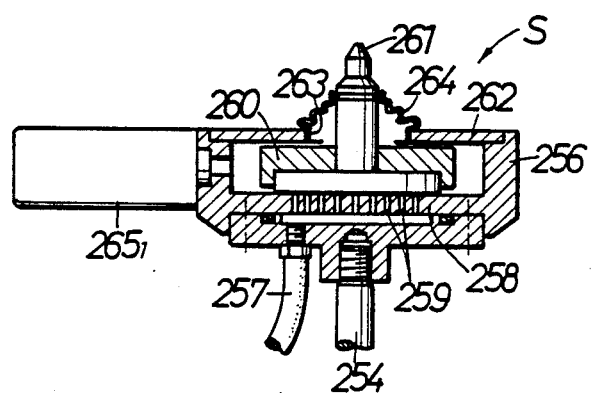

As clearly shown in FIGS. 33 and 34, an air inlet pipe 257 is attached to a bottom wall of a disk-shaped casing 256, so that pressurized air from the air inlet pipe 257 is dispersed through a large number of air holes 259 made in a partition wall 258 and introduced into the casing 256. A float plate 260 is disposed within the casing 256. An engagement pin 261 projectingly mounted centrally on an upper surface of the float plate 260 projects above an opening 263 in a lid plate 262 for the casing 256. An expansion boot 264 for maintaining the interior of the casing air-tight is provided between an outer peripheral surface of the engagement pin 261 and an inner peripheral surface of the opening 263. On an outer peripheral surface of the casing 256, a pair of detectors $265_1$ and $265_2$ are disposed with phases offset through 90° in respect to the center of the casing for detecting the misregister amounts of the vehicle body 4 in the widthwise and lengthwise directions.

The individual sensor units $247_1$ to $247_4$ serve to measure the distances between the float plate 260 and the register individual detectors $265_1$ and $265_2$ to detect the misregister amounts of the vehicle body 4 at the time when with the float plate 260 floated up by pressurized air, the engagement pin 261 has been engaged into a detecting hole 25, 266 in the vehicle body 4.

(iii) Operating of position - adjusting arrangement

The vehicle body 4 is transported by a transporting mechanism which is not shown, and positioned on the support base 3 by bringing the individual locating holes 6 into fitted engagement with the corresponding locating pins 7 on the support base 3.

The bolt set pallets 15 of the front and rear pallet members 8f and 8r are placed onto the first and second placing portions $209_1$ and $209_2$ of the placing rest 208 with the rail members 117 interposed therebetween. When locating of the bolt set pallets 15 has been performed by means of the individual pins 214 (FIG. 24) in this state, the front and rear bottom parts 5f and 5r are in an aligned or registered relation.

In the first to fourth sensor units $247_1$ and $247_4$ of the correcting mechanism 217, when the operating cylinders 253 are actuated to extend the piston rods 253a, the sensors S are moved in the widthwise direction of the vehicle body, whereupon the respective sensor S of the first and second sensor units $247_1$ and $247_2$ are disposed below the locating holes 25 (FIG. 3) as detecting holes located in the front side of the vehicle body 4, respectively, while the respective sensors S of the third and fourth sensor units $247_3$ and $247_3$ are disposed below the detecting holes 266 (FIG. 3.) in the rear side of the vehicle body 4, respectively.

When the small-sized operating cylinders 255 of the individual sensor units $247_1$ to $247_4$ are actuated, the engagement pins 261 thereof engage the corresponding locating holes 25 and detecting holes 266, whereby the misregister amounts of the vehicle body 4 in the widthwise and lengthwise directions X and Y are detected by the detectors $265_1$ and $265_2$ of the sensor units $247_1$ to $247_4$. After completion of this detection, the sensors S are brought back to the original positions by operation of the operating cylinders 253 and the small-sized operating cylinders 255.

The signals indicative of the misregister amounts of the vehicle body 4 from the individual sensor units $247_1$ to $247_4$ are passed to the comparator 248 where the misregister amounts of the vehicle body 4 are compared whether or not they are less than the floating amounts of the first and second placing portions $209_1$ and $209_2$.

When the misregister amounts of the vehicle body 4 have been decided in the comparator 248 to be less than the floating amounts of the first and second placing portions $209_1$ and $209_2$, the comparator 248 supplies an operating signal to the lifting-mechanism controller 250, so that the lifting mechanism 161 (FIG. 20) is operated to raise the front and rear bottom parts 5f and 5r. The four locating pins 26 (FIG. 7) located on the bolt set pallet 15 of the front pallet member 8f are fitted into the four locating holes 25 in the front side of the vehicle body 4, respectively, thus providing the locating of the front bottom part 5f relative to the vehicle body 4.

In response to this locating of the front part 5f, the placing rest 208 in a floated state is moved, whereby the misregister amounts of the vehicle body 4 can be corrected by a slight movement of the placing rest 208 in correspondence to the floating amount to locate the front and rear bottom parts 5f and 5r in their registered or aligned condition relative to the vehicle body 4.

Thereafter, the front and rear turning machines 13f and 13r are operated, so that the front and rear bottom parts 5f and 5r are assembled to the vehicle body 4.

On the other hand, when it is decided in the comparator 248 that the misregister amounts of the vehicle body 4 exceeds the floating amounts of the first and second placing portions $209_1$ and $209_2$, the comparator 248 delivers the operating signal to the servo motor controller 249, so that the servo motor 240 is operated to move the placing rest 208 in the widthwise direction X and/or in the lengthwise direction Y, thereby achieving the correction of the positions of the front and rear bottom parts 5f and 5r.

VI. Front and rear bolt feeders 10f and 10r

The front and rear bolt feeders 10f and 10r have the same structure and hence, only the front bolt feeder 10f will be described below.

Figure 35:
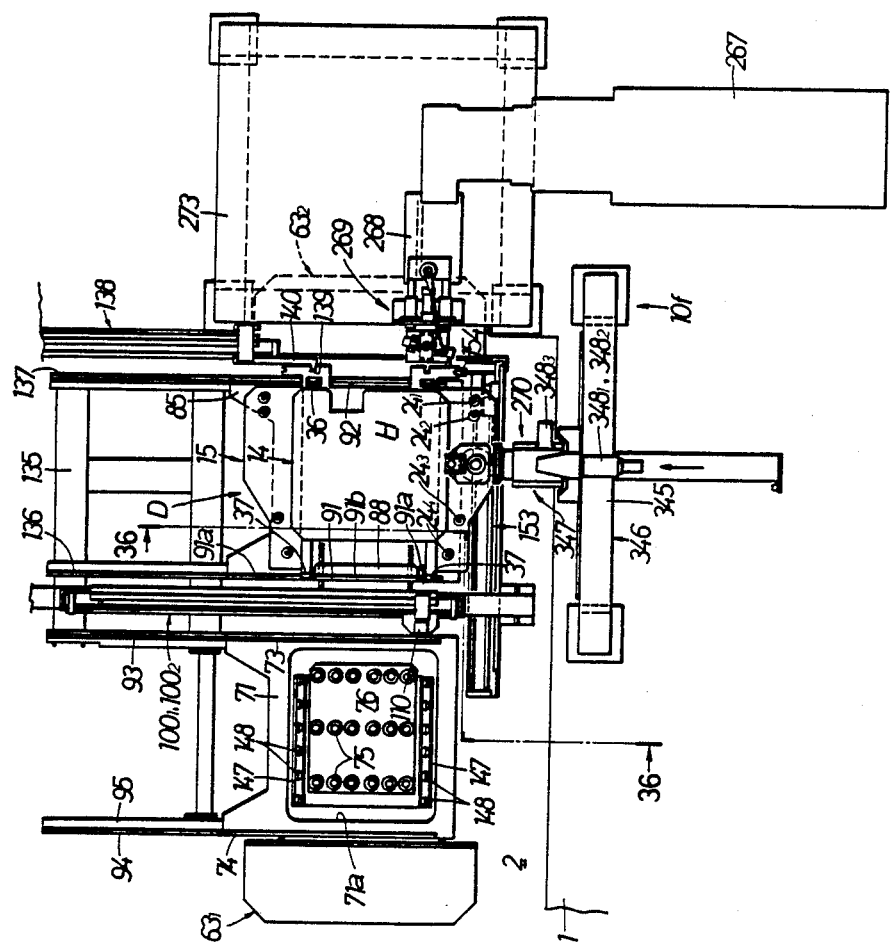
Figure 36:
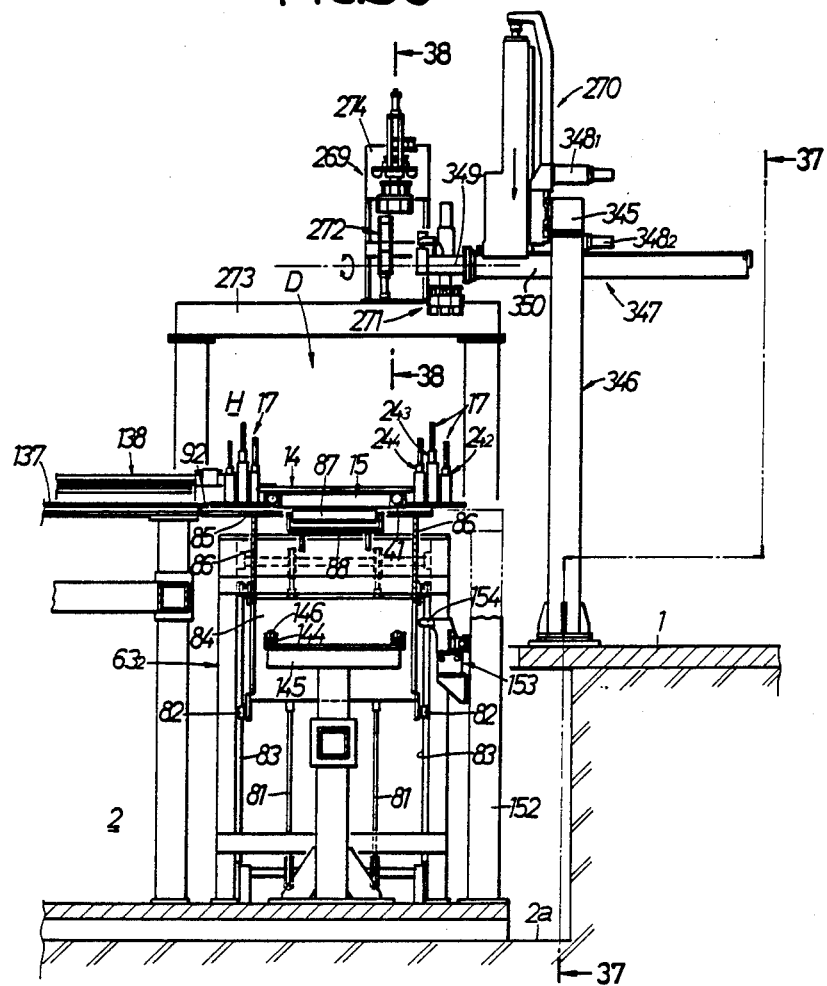
Figure 37:
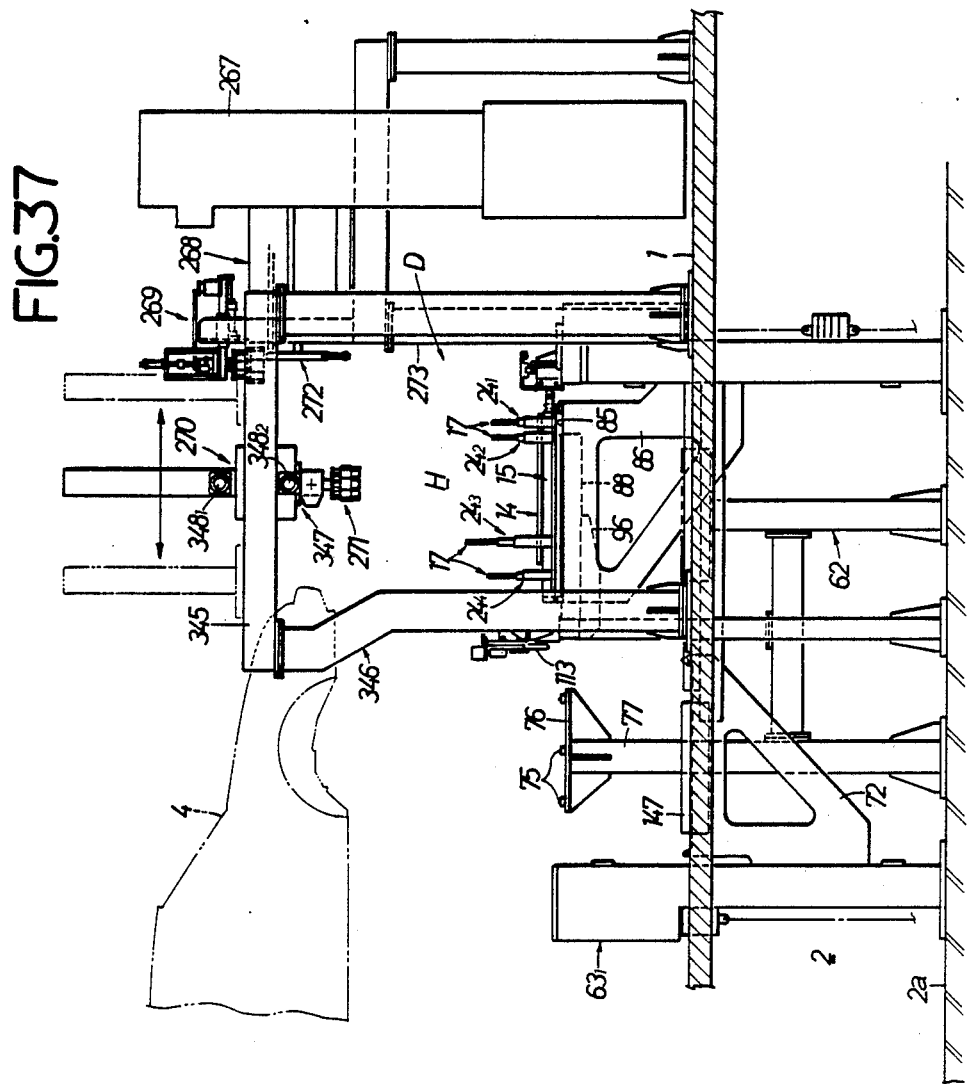

As shown in FIGS. 35 to 37, the front bolt feeder 10f is mounted adjacent the pallet separating position D above the bolt set pallet 15 to dispense eight bolts 17 with their head top surfaces up, one by one, to the first to fourth eight bolt-tightening sockets $24_1$ to $24_4$ opened upward.

Specifically, the front bolt feeder 10f comprises a transfer mechanism 268 for transferring the bolts 17 carried by conveyer means 267 with their head top surfaces up, one by one, a delivery mechanism 269 movable between a holding position to hold the eight bolts transferred by the transfer mechanism 268 by grasping them one by one and a delivery position to release the holding for all the bolts 17 at a time, and a dispensing mechanism 270 movable between a receiving position to receive all the bolts 17 at such delivery position and a feeding position to dispense the bolts 17 one by one to the individual sockets $24_1$ to $24_4$. The dispensing mechanism 270 includes a receiving portion 271 adapted to receive the bolts 17 with their head top surfaces up at the receiving position and then to rotate through 180° to turn the head top surface downward.

In the illustrated embodiment, an ejector mechanism 272 is disposed adjacent a bolt transferred end of the transfer mechanism 268 and adapted to cause the delivery mechanism 269 to grasp, one by one, the bolts 17 transferred by the transfer mechanism 268.

(i) Construction of each of the mechanisms (a) Transfer mechanism 268

Figure 38:
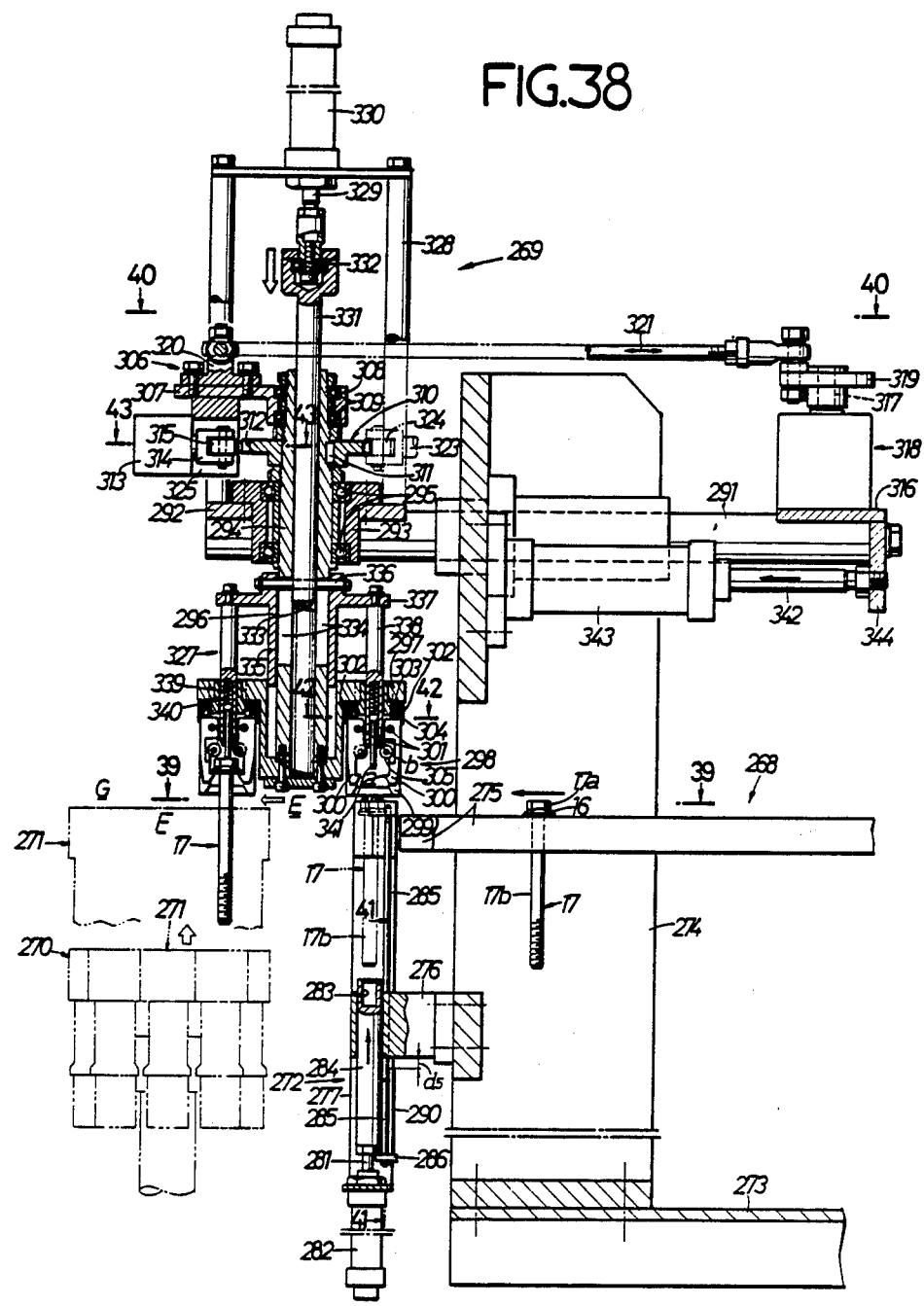
Figure 39:
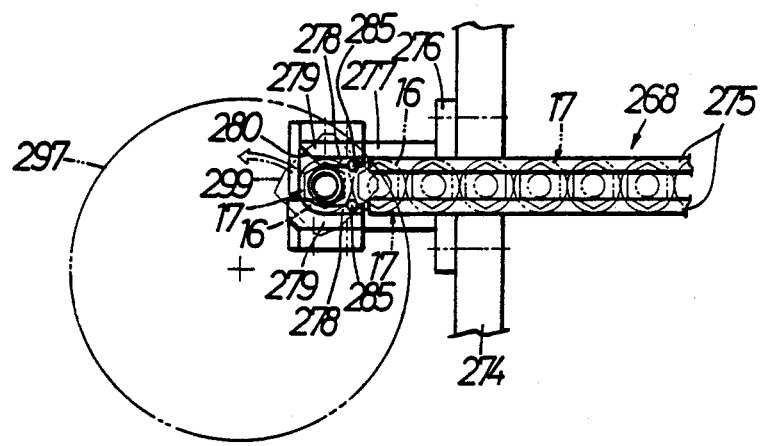
Figure 40:
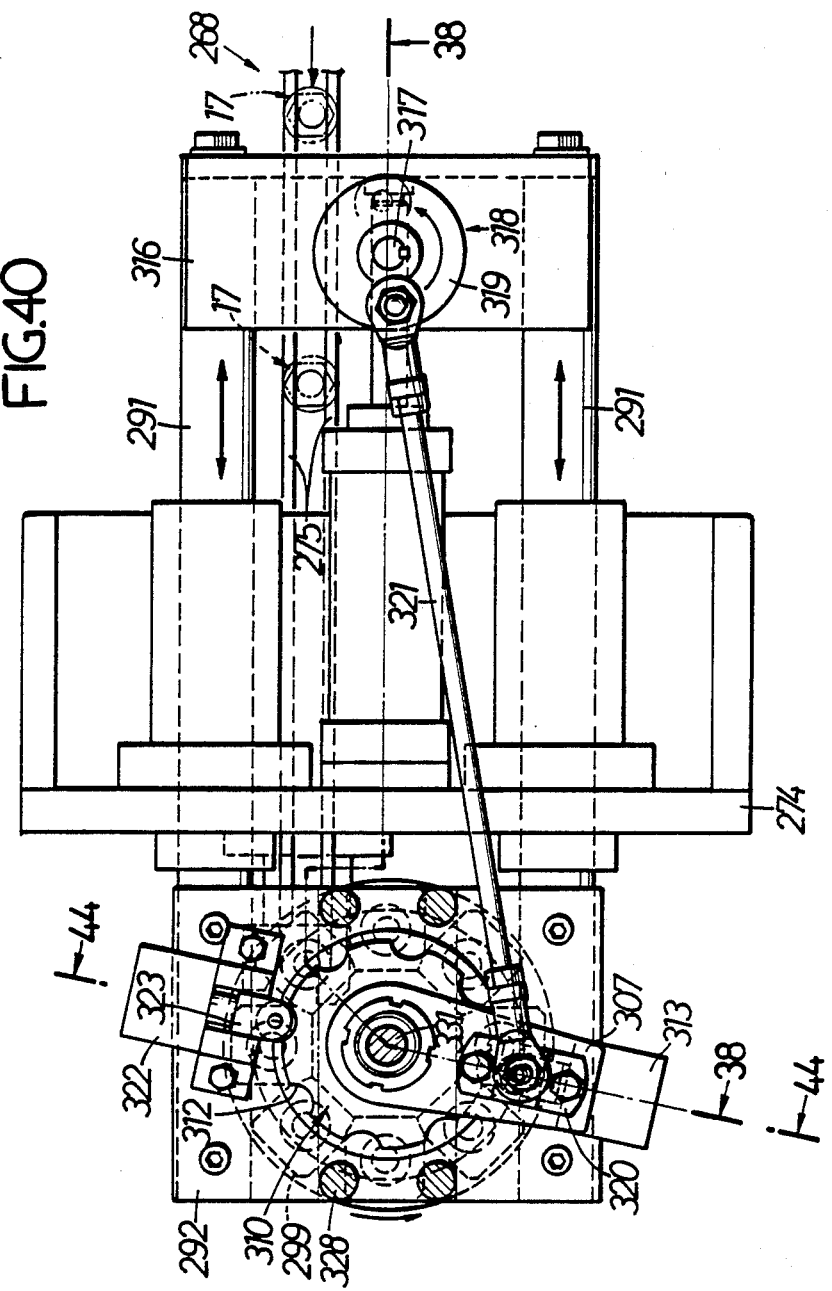

As clearly shown in FIGS. 38 to 40, the transfer mechanism 268 is constructed from the known vibration-type straight drive feeder, and includes a pair of plate-like transfer members 275 supported in parallel and horizontally at predetermined distance on a support side plate 274 extended from a support frame 273 on the floor 1 to transfer the bolts 17 with lower surface of the head 17a (in the illustrated embodiment, the lower surfaces of the washer 16) of the bolts 17 being placed onto an upper surface of the two transfer members 275 and with the shanks 17b of the bolts 17 depending between both the transfer members 275.

(b) Ejector mechanism 272

Figure 41:
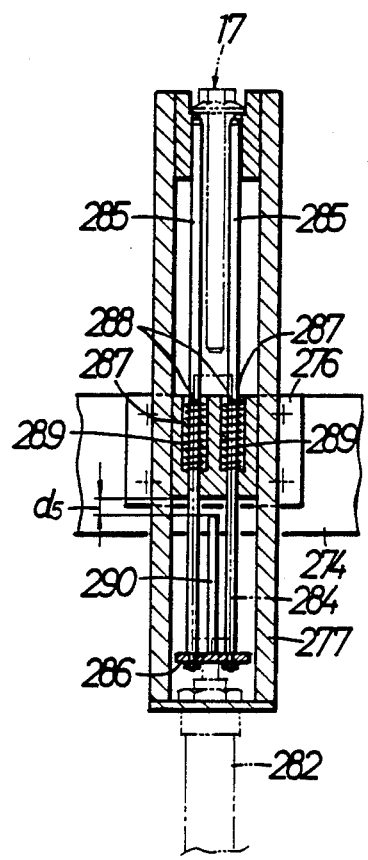

As clearly shown in FIGS. 38 and 41, a bracket 276 is mounted on the support side plate 274 below the bolt transfer end. Carried on the bracket 276 is a stop member 277 for stopping the transferred bolts 17 to keep them on standby for an ejecting operation. The stop member 277 is provided at its upper end with a pair of parallel steps 278 lying at the substantially same level as the upper surfaces of the transfer members 275, and rising portions 279 adapted to engage the outer peripheral surface of the washer 16 of the bolts 17 to block the advancing of the bolt 17. An opening 280 is provided between leading ends of both rising portions 279 to permit passing of the shank 17b of the bolt 17 therethrough.

An operating cylinder 282 for ejection of the bolts, with a piston rod 281 pointing upward, is mounted on a lower portion of the stop member 277. An ejecting rod 284 is connected to a leading end of the piston rod 281 and has a hole 283 adapted to fit with the lower end of the shank 17b of the bolt 17 which is at a stop.

A pair of stop rods 285 are inserted in the bracket 276 to lie in parallel to the ejecting rod 284 and at locations closer to the support side plate 274 and at locations closer to the support side plate 274 than the ejecting rod 284. A connecting plate 286 is laid between lower ends of the both stop rods 285. A spring is provided in compression between a bottom surface of a larger diameter hole 287 made in the bracket 276 to surround each of the stop rods 285 and a lock pin 288 of each of the stop rods 285 to bias each stop rod 285 upward.

A stop pin 290 extends upwardly from the connecting plate 286 in parallel to the stop rods 285, with a leading end of the stop pin 290 opposed to a lower surface of the bracket 176.

In a lowered position of the ejecting rod 284, each stop rod 285 is also in its lowered position with an upper edge of the connecting plate 286 engaged by a lower end face of the ejecting rod 284. In this manner, a leading end face of the each stop rod 285 is located below an upper surface of the step 278 so as not to prevent advancing of a bolt 17. In this state, a predetermined distance $d_5$ is provided between a leading end face of the stop pin 290 and the lower surface of the bracket 276, as shown in FIGS. 38 and 41.

On the other hand, during raising of the ejecting rod 284, expansion of the spring 289 causes each stop rod 285 to follow the raising of the ejecting rod 284. When the stop pin 290 abuts against the bracket 276, the raising of the stop rod 285 is stopped. In this position of stoppage of raising of the stop rod 285, an ejecting operation for the proceeding bolt 17 by the ejecting rod 284 is not yet initiated, and as indicated by a chain line in FIG. 38 and as shown in FIG. 39, the leading end of each stop rod 285 projects into between washers 16 of the proceeding bolt 17 and the succeeding bolt 17. This precludes feeding of the succeeding bolt 17 toward the step 278 during ejection of the proceeding bolt 17 and thus, in ejecting of the proceeding bolt 17, it is possible to prevent the interferences of such proceeding bolt 17 and the succeeding bolt 17 with each other and the interference of the succeeding bolt 17 and the ejecting rod 284 with each other. This ensures that ejection of the bolts can be smoothly performed one by one.

(c) Delivery mechanism 269

As shown in FIGS. 38 and 40, a pair of bar-like support elements 291 are mounted on an upper portion of the support side plate 274 for sliding movement in parallel to each other and in a horizontal plane. A plate element 292 is laid between upper surfaces at one end of both support elements 291 lying above the ejector mechanism 272. A bearing sleeve 293 is secured to an intermediate portion of the plate element 292 with its vertical axis passing through the latter. A hollow shaft 294 is rotatable supported at its intermediate portion on the bearing sleeve 293 through bearings 295.

A cylindrical element 296 is loosely fitted over a lower portion of the hollow shaft 294 from the lower end face side thereof at a predetermined distance spaced apart from an outer peripheral surface of the hollow shaft 294 and is secured at its bottom to the lower end face of the hollow shaft 294. The cylindrical element 296 comprises a support flange 297 at an upper portion of its outer peripheral surface, and a bolt grasping portion 298 is provided on the support flange 297 in the following manner.

Figure 42:
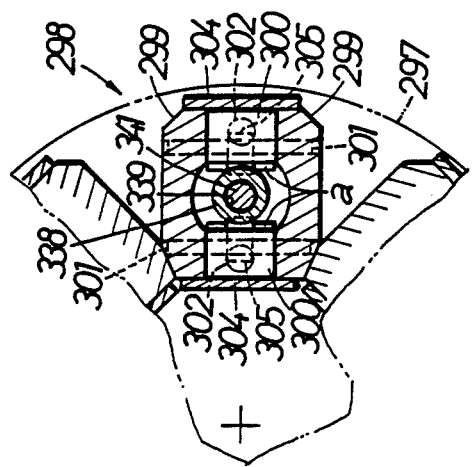

As clearly shown in FIG. 42, eight sets of two-in-a-set support members 299 are mounted on the support flange 297 at circumferentially uniformly spaced apart distances to extend downward from the support flange 297. A pair of grasping claws 300 are disposed between both support members 299 in each set and are pivotally attached at their upper end on the two support members 299 by pivots 301. A steel ball 302 and a spring 303 are interposed between a lower surface of the support flange 297 and an upper face of each of the grasping claws 300. Each steel ball 302 abuts against a portion of the upper end face of the corresponding one of the grasping claws 300 positioned radially outwardly of the pivot 301 by the biasing force of the spring 303, whereby hook-like engaging portions a at the leading ends of the grasping claws 300 are urged in a closing direction to approach each other. A grasping stop plate 304 also serving as an outer stopper for the spring 303 and the steel ball 302 is positioned between upper portions of the support members 299. Rollers 305 are rotatable pinned at intermediate portions of the grasping claws 300, respectively and used when the claws 300 are to be opened.

Figure 43:
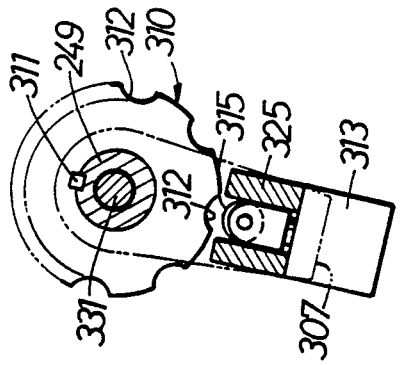

A rotational drive 306 intermittently rotates the hollow shaft 294 in order to grasp each succeeding bolt 17 after grasping of the proceeding bolt 17 by the pair of grasping claws 300 and is constructed as follows:

As clearly shown in FIGS. 38, 40 and 43, above the bearing sleeve 293, a cylindrical portion 308 at the end of the support member 307 is rotatably supported on the hollow shaft 294 through a bearing 309. A drive plate 310 is secured to the hollow shaft 294 through a key 311 between the support member 307 and the bearing sleeve 293. In correspondence to the eight sets of grasping claws 300, eight circular arc-shaped notches 312 are provided in an outer peripheral edge of the drive plate 31 at circumferentially uniformly spaced apart distances.

A rotating operation cylinder 313 is mounted on a lower surface of the support member 307. A roller 315 capable of engaging with and disengaging from each of the notches 312 in the drive plate 310 is mounted on a leading end of a piston rod 314 of the operating cylinder 313. A plate element 316 is laid on ends of the two support elements 291 opposite from the drive plate 310. A rack and pinion type drive source 318 is disposed on an upper surface of the plate element 316 and includes a rotary shaft 317 rotatable in a counterclockwise direction as shown in FIG. 40. A connecting rod 321 is pivotally connected at its opposite ends to a connecting member 319 attached to the rotary shaft 317 of the drive source 318 and a connecting member 320 mounted on the upper surface of the support member 307 to project therefrom, respectively.

Figure 44:
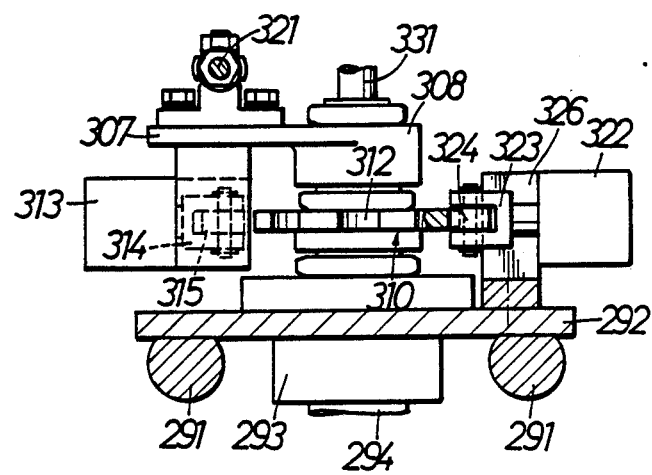

As clearly shown in FIG. 44, an operating cylinder 322 for a detent function is attached on an upper surface of the plate element 292. A roller 324 capable of engaging with and disengaging from each notch 312 in the drive plate 310 is mounted on a leading end of the detent cylinder 322. The two operating cylinders 313 and 322 are provided with guide plates 325 and 326 for guiding the respective piston rods 314 and 323 with their leading ends clamped therebetween.

A release portion 327 for releasing the holding for all the bolts 17 grasped by the individual pairs of grasping claws 300 at a time is constructed as follows:

A releasing operating cylinder 330 with a leading end of a piston rod pointing downward is supported on a support frame 328 which is mounted on the plate element 292 and extends upwardly therefrom (FIG. 38). An actuating shaft 331 slidably fitted in the hollow shaft 294 is rotatable connected at its upper end to a lower end of the piston rod 329 through a thrust bearing 332. A return spring 333 is provided in compression between a lower end face of the actuating shaft 331 and a bottom of the cylindrical element 296.

Below the bearing sleeve 293, a pair of axially extending elongated holes 334 are made in an opposed relation to each other in a peripheral wall of the hollow shaft 294. An upper end of liftable cylindrical member 335 slidably fitted over the outer peripheral surface of the hollow shaft 294 is connected with a lower end of the actuating shaft 331 by a stop pin 336 passing therethrough and through both elongated holes 334. This enables the liftable cylindrical member 335 to be raised and lowered through an annular space between the hollow shaft 294 and the cylindrical element 296 independently of the hollow shaft 294 with raising and lowering movements of the actuating shaft 331.

The liftable cylindrical member 335 includes a support flange 337 on an outer peripheral surface of its upper portion. Upper ends of releasing rods 338 passing through the support flange 297 of the cylindrical element 296 are attached to the support flange 337. A lower end face of each releasing rod 338 is formed with a tapered surface b converging downward, so that with lowering of each releasing rod 338, the tapered surface b urges both rollers 305 of the set of grasping claws 300 associated with that releasing rod to open the both claws 300.

A downward opened hole 339 (FIGS. 38 and 42) is made in each of the releasing rods 338. A larger diameter base portion of an urging pin 341 biased downward by a spring 340 is slidably fitted in the hole 339. Each of the urging pins 341 extends downward between the rollers 305, so that its lower end face is normally located in the vicinity of the engaging portion a. During grasping of the bolt 17, such lower end face urges the top surface of the head 17a of the bolt 17 to insure grasping of the bolt 17 in cooperation with the both grasping claws 300.

A movement operating cylinder 343 with a horizontal piston rod 342 is attached to a surface of the support side plate 274 opposite from the bolt grasping portion 298 and the like to provide the reciprocal movement of the delivery mechanism 269 of the aforesaid construction between a holding position E and a delivery position F. A leading end of the piston rod 342 is secured to a connecting plate 344 for interconnecting both support elements 291.

(d) Dispensing mechanism 270

As shown in FIGS. 35 to 37, a portal or gate-type frame 346 is provided on the floor 1 in the vicinity of the pallet separating position D and includes a horizontal guide member 345 parallel to the pallet transporting direction in the fourth transport line L4. An orthogonal triple-shaft type robot 347 is supported on the horizontal guide member 345. The robot 347 can be raised and lowered by a first drive motor $348_1$, and moved horizontally in a lengthwise direction of the horizontal guide member 345 by means of a second drive motor $348_2$ and further horizontally in a direction perpendicular to the lengthwise direction of the horizontal guide member 345 by means of a third drive motor $348_3$.

An arm 349 located at a leading end of the robot 347 is rotatable relative to a body 350, and a receiving portion 271 is mounted on the arm 349 for receiving the bolts 17 from the delivery mechanism 269.

Figure 45:
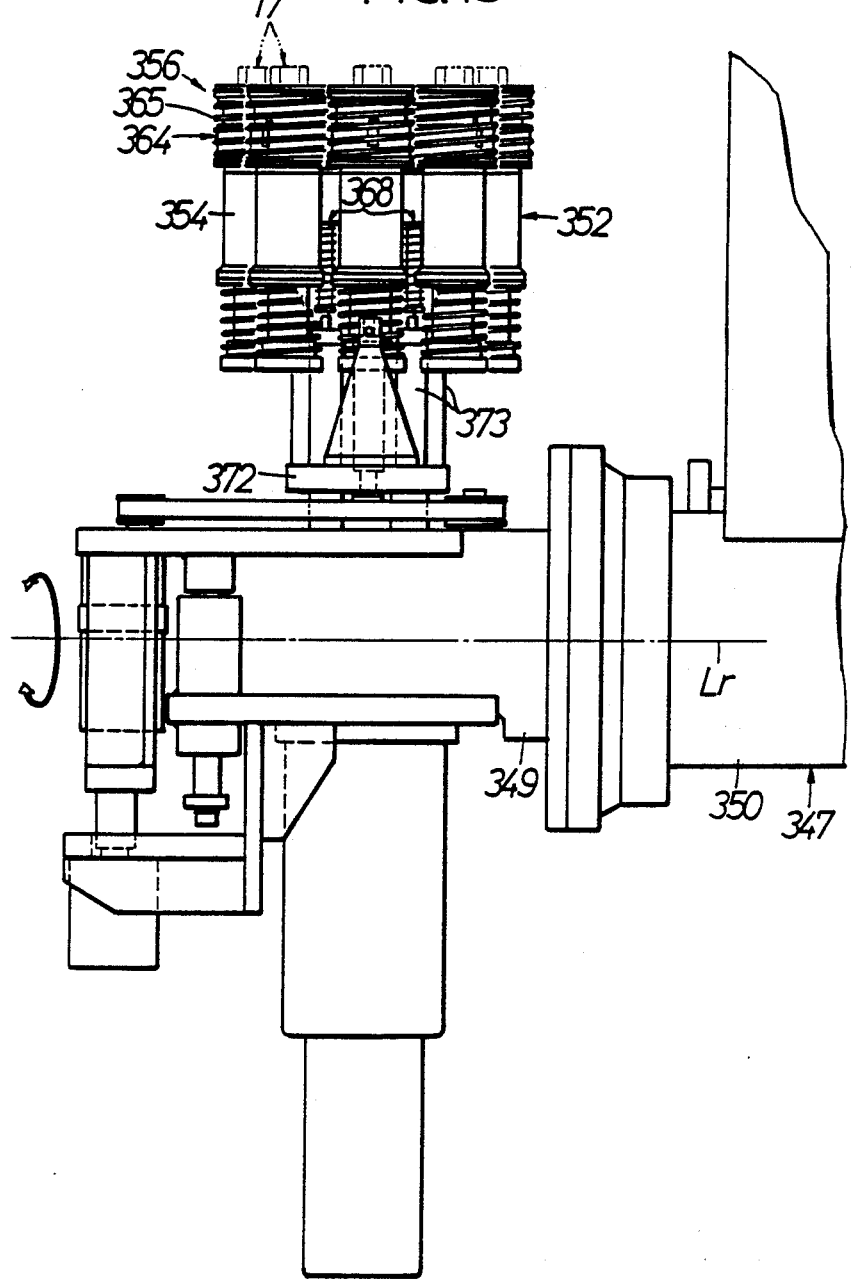
Figure 46:
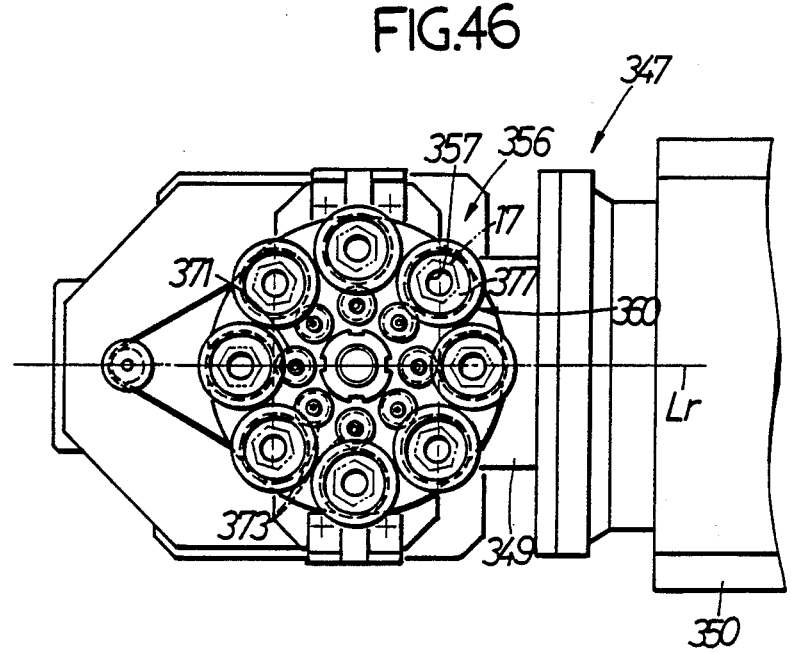
Figure 47:
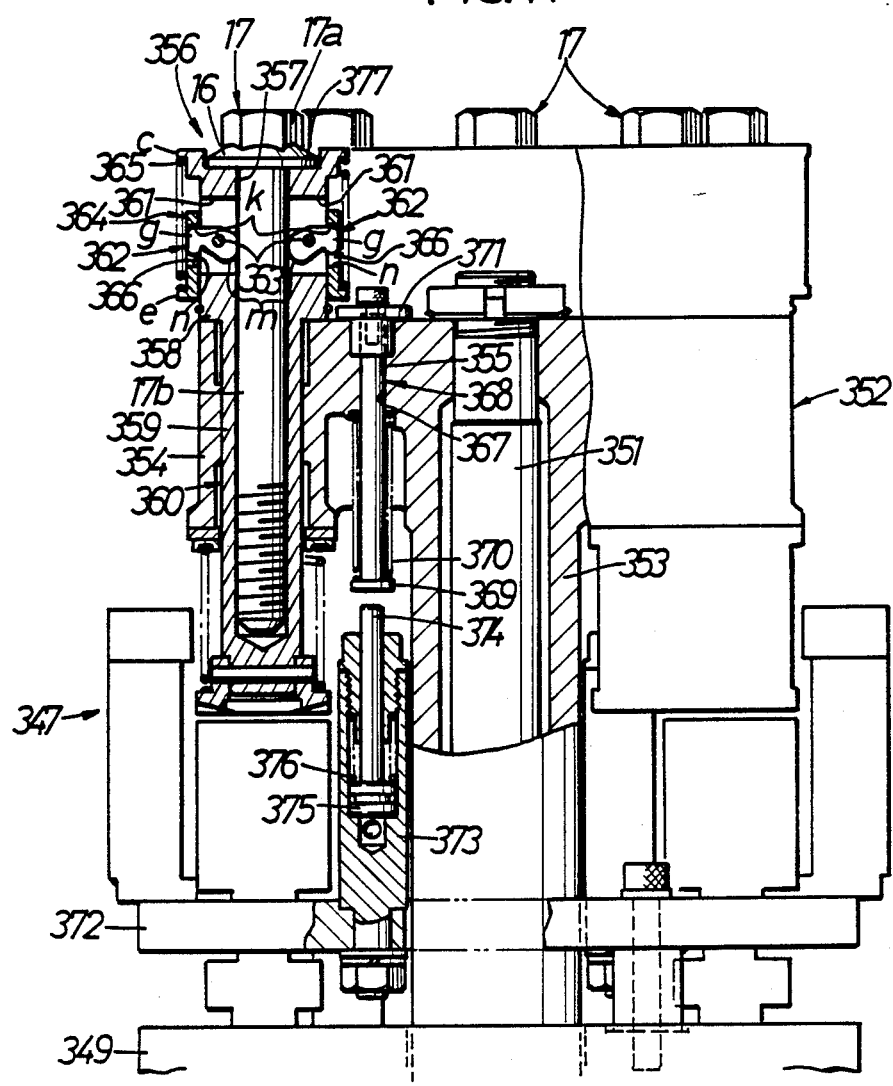

As shown in FIGS. 45 to 47, the receiving portion 271 is constructed as follows:

A support shaft 351 is mounted on the arm 349 and has an axis perpendicular to a rotation axis Lr of the arm 349. A bolt holder supporting member 352 is supported on the support shaft 351. The support member 352 comprises a hollow shaft portion 353 fixedly fitted over the support shaft 351, eight cylindrical portions 354 arranged at circumferentially uniformly spaced apart distances on an outer periphery of the hollow shaft portion 353 and each having an axis parallel to the hollow shaft portion 353, and a connection portion 355 which interconnects each of the cylindrical portions 354 and the hollow shaft portion 353. Each of the cylindrical portions 354 corresponds to each pair of the grasping claws 300 in the delivery mechanism 269.

A bolt holder 356 as described below is supported on each cylindrical portion 354.

A cylindrical element 360, which includes a larger diameter portion 358 having a bolt inserting opening 357 and a smaller diameter bottomed portion 359, is fitted in the cylindrical portion 354 with the smaller diameter portion 359 located closer to the arm 349. A pair of axially extending elongated holes 361 are made in an opposed relation to each other in a peripheral wall of the larger diameter portion 358. A grasping claw 362 is disposed in each of the elongated holes 361 and pivotally supported at an intermediate portion thereof on the larger diameter portion 358 through a pivot 363.

An operating tube 364 for opening and closing the both grasping claws 362 is fitted over an outer peripheral surface of the larger diameter portion 358. A spring 365 is compressedly provided between a flange portion c located on the outer peripheral surface of the larger diameter portion 358 closer to an opening 357 and a flange portion e located on an outer peripheral portion of the operating tube 364 closer to the smaller diameter portion 359.

A pair of windows 366 are made in an opposed relation to each other in a peripheral wall of the operating tube 364 with a first engaging portion g located closer to an outer end of the each grasping claw 362 loosely fitted in each of the windows 366.

When the operating tube 364 is permitted to slide toward the smaller diameter portion 359 by the biasing of the spring 365, an inner surface k of each engaging portion g of each grasping claw 362, whereby second engaging portions m of the individual grasping claws 362 closer to their inner ends are swung or pivoted in a closing direction to approach each other, thereby grasping the shank 17b of the bolt 17.

A plurality of holes 367 are made in the connection portion 355 of the support member 352, each adjacent and in parallel to one of the cylindrical portions 354. A releasing pin 368 is slidably received in each through hole 367. A spring 370 is compressedly provided between an inner end face of the connection 355 and a flange 369 at an inner end of the releasing pin 368, so that the biasing force of the spring 370 causes a flange 371 at an outer end of the releasing pin 368 to engage an outer end face of the connection portion 355 and also causes a part of an outer end face of the outer end flange 371 to be opposed to a part of the flange portion e of the operating tube 364.

A support plate 372 is attached to the hollow shaft portion 353 of the support member 352. Plural release operating cylinders 373 are supported on the support plate 372 in correspondence to each of the releasing pins 368. A return spring 376 is connected to a piston 375.

When the operation of the operating cylinder 373 causes the piston rod 374 to urge the releasing pin 368 along it axis, the outer end flange 371 of the releasing pin 368 pushes the operating tube 364 to slide against the biasing of the spring 365, so that an inner surface n of each window 366 closer to the smaller diameter portion 359 engages the first engaging portion of each grasping claw 362 to swing the grasping claw 362. This causes the second engaging portions m of the individual grasping claws 362 to swing in an opening direction away from each other to release the grasping of the bolt 17.

ii. Operation of front bolt feeder 10f

As shown in FIGS. 38 and 39, the bolt 17 with the top surface of its head 17a up is transported along the transfer member 275 of the transfer mechanism 268. The movement thereof is stopped at the transfer end of the transfer mechanism 268 by the stop member 277 of the ejector mechanism 272.

The piston rod 342 of the operating cylinder 343 for moving the delivery mechanism 269 is in an extended state and thus, the delivery mechanism 269 is in the holding position E, with the pair of grasping claws 300 being opposed to the stop member 277.

The operation of the bolt-ejecting operation cylinder 282 causes the piston rod 281 thereof to be extended, thereby raising the ejecting rod 284, so that the hole 282 therein is brought into engagement with the lower end of the shank 17b of the bolt 17 to eject the bolt 17 upward.

The head 17a of the bolt 17 opens the grasping claws 300, so that the bolt 17 is grasped by both grasping claws with the lower surface of the washer 16 thereof engaging the engaging portions a. In this state, the urging pin 341 pushes against the top face of the head 17a of the bolt 17 by force of the spring 340 and hence, the bolt 17 cannot be backlashed.

In the delivery mechanism 269, the piston rod 314 of the rotating operation cylinder 313 is in an extended state, with the roller 315 thereof being in engagement with the one notch 312 in the drive plate 310. The piston rod 323 of the operating cylinder 322 is in a retracted state, with the roller 324 thereof being out of engagement with the notch 312 in the drive plate 310.

The operation of the drive source 318 to turn the rotary shaft 317 through 180° in the counterclockwise direction in FIG. 40 causes the support member 307 and thus the turning operation cylinder 313 to be swung through 45° by virtue of the connecting rod 321 to turn the drive plate 310, so that the shank 17b of the bolt 17 previously grasped passes through the opening 280 in the stop member 277. Then, the subsequent pair of grasping claws 300 are opposed to the stop member 277.

The operation of the detent operating cylinder 322 causes the piston rod 323 thereof to be extended, so that the roller 324 engages the notch 312 in the drive plate 310, thereby providing the locating of the grasping claws 300. Upon the operation of the rotating operating cylinder 313, the piston rod 314 thereof is retracted, so that the roller 315 is disengaged from the notch 312 of the drive plate 310. Then, the operation of the drive source 318 to rotate the rotary shaft 317 through 180° brings the rotating operation cylinder 313 back to the original position.

In this manner, the eight bolts 17 are transferred to and are held by the delivery mechanism 269 with a single bolt 17 grasped by each pair of grasping claws 300.

The operation of the displacing operating cylinder 343 causes the piston rod 342 thereof to be retracted, and the delivery mechanism 269 is moved to the delivery position F.

As shown in FIG. 38, in the receiving portion 271 of the dispensing mechanism 270, the bolt holder 356 thereof is in a position in which it is opposed to the lower end of the shank 17b of each bolt 17 with each bolt inserting opening 357 faced upward as a result of pivotal movement of the arm 349. The grasping claws 362 are in their positions in which they are opened through the operating tube 364 as a result of the releasing pin 368 urged by the piston rod 374 by the operation of each releasing operation cylinder 373. Then, raising of the robot 347 brings the receiving portion 271 to the receiving position g. Then shank 17b of each bolt 17 is inserted into each cylindrical element 360 of the bolt holder 356 through the opening 357.

In the delivery mechanism 269, the operation of the releasing operation cylinder 330 permits the piston rod 329 to be extended to lower each releasing rod 338 through the operating shaft 331 and the liftable cylindrical element 335, so that the tapered surface b of each releasing rod 338 urges the rollers 305 to open the grasping claws 300. This opening motion and the pushing-out motion of the urging pin 341 under the influence of the spring 340 causes each bolt 17 to fall into each cylindrical element 360, so that the washer 16 thereof is fitted into an annular recess 377 in the peripheral edge of the opening 357 in the cylindrical element 360.

Each releasing operation cylinder 373 of the dispensing mechanism 270 is deactivated, so that the piston rod 374 is spaced apart from the releasing pin 368. The operating tube 364 is caused to slide by the biasing force of the spring 365, thereby causing the grasping claws 362 to grasp the shank 17b of the bolt 17.

The horizontal movement of the robot 347 causes the receiving portion 271 to move from the receiving position G and then, the arm 349 is swung through 180° to turn down the head 17a of each bolt 17.

The bolt set pallet 15 is on standby in the pallet separating position D in a superposed relation to the work set pallet. The robot 347 is moved to align the receiving portion 271 to each of the feeding positions H (FIGS. 35 to 37) corresponding to each of the first to fourth sockets 24₁ to 24₄. By the subsequent, successive operation of each releasing operation cylinder 373, the bolts are released and the head 17a of the bolt 13 is engaged in the corresponding one of the first to fourth sockets 24₁ to 24₄, for dispensation of each bolt 17.

In this manner, each bolt 17 with the top face of its head 17a up can be automatically fed to each of the sockets 24₁ to 24₄.

As a result of disposition of the delivery mechanism 269 between the transferring mechanism 268 and the dispensing mechanism 270, it is possible to allow the delivery mechanism 269 to perform the bolt holding operation during operation of the dispensing mechanism 270, thereby eliminating the play time for the dispensing mechanism 270. Moreover, the dispensing mechanism 270 is allowed to receive a plurality of bolts 17 at a time and therefore, it is possible to efficiently and reliably carry out the delivery of the bolts to the dispensing mechanism 270, as compared with the case where the dispensing mechanism 270 is allowed to receive the bolts 17 one by one form the transferring mechanism 268.

Figures illustrating the second front and rear feeders 11f and 11r in detail have been omitted, but it will be understood that both feeders 11f and 11r are designed to grasp the front and rear bottom parts 5f and 5r to place them onto the work set pallet 14.

In addition, in the front and rear pallet members 8f and 8r, the work set pallet 14 and the bolt set pallet 15 can be formed into an integral construction. Further, the positioning and fixing of the vehicle body 4 are not limited to those in the above embodiment, and may be achieved, for example, at two points on the front and rear portions or on either one left or right side of the vehicle body 4. Alternatively, a plurality of locating holes 25 may be provided in the rear portion of the vehicle body 4, and locating pins 26 adapted to be fitted into the corresponding locating holes 25 may be provided on the rear pallet member 8r. In this case, the number of the locating holes 25 is not limited to four.

What is claimed is:

1. A system for assembling bottom parts for vehicles, in which the bottom parts are transported to a position below a vehicle body positioned and fixed and are assembled to said vehicle body, said system comprising:
   a pallet member for holding thereon bottom parts and a plurality of threaded parts for fastening said bottom parts to said vehicle body;
   a transporter for circulating said pallet member so that said pallet member is stopped below said vehicle body;
   a first feeder disposed in a vicinity of said transporter to feed said threaded parts to said pallet member;
   a second feeder also disposed in a vicinity of said transporter to feed said bottom parts to said pallet member;
   a lifter disposed below said vehicle body to raise and lower said pallet member relative to said vehicle body; and
   a turning machine also disposed below said vehicle body for turning said threaded part to fasten said bottom part to said vehicle body when said pallet member is in a raised position.

2. A system for assembling bottom parts for vehicles according to claim 1, wherein said lifter includes a base, a lift table disposed above said base, and a lifting mechanism having an X-type link interposed between said base and said lift table, said X-type link located on said base being provided at a pivoting point with a detecting mechanism to convert a pivoting angle of the pivoting point into an indication of the height of said lift table.

3. A system for assembling bottom parts for vehicles according to claim 2, wherein said pallet member includes a plurality of locating pins which are to be fitted into a plurality of locating holes in said vehicle body, and mating threaded parts for said threaded parts are held on said vehicle body for movement in a horizontal plane.

4. A system for assembling bottom parts for vehicles, according to claim 3, wherein said lifting mechanism is capable of raising and lowering said lift table relative to said vehicle body; and said system further includes a movable placing rest which is located below said vehicle body and onto which the pallet member is placed, a placing rest-displacing mechanism connected to the placing rest so that the placing rest has a predetermined amount of float, said placing rest and the displacing mechanism being disposed on said lift table, and a correcting mechanism to detect a misregister of said vehicle body to operate said displacing mechanism, when an amount of misregister exceeds said predetermined amount of floating.

5. A system for assembling bottom parts for vehicle, according to claim 4, wherein said threaded part is a bolt, and said pallet member includes a plurality of bolt-tightening sockets opened upward so that said bolt with a head top face down may be fed thereinto, and wherein said first feeder comprises a transfer mechanism for transferring said bolts one by one with head top faces up, a delivery mechanism movable between a holding position to hold a plurality of the bolts transferred by said transfer mechanism by grasping the bolts one by one and a delivery position to release all the bolts at the same time, and a dispensing mechanism movable between a receiving position to receive said bolts at the delivery position and a feeding or dispensing position to dispense said bolts to said sockets, said dispensing mechanism including a receiving portion to receive said bolts with head top faces up at the receiving position and then to rotate through 180° to turn said head top faces down.

6. A system for assembling bottom parts for vehicles, comprising:
   a pallet member spaced apart at different distances from fastening portions of the vehicle body, said pallet member holding thereon bottom parts and a plurality of threaded parts for fastening said bottom parts to said vehicle body, said pallet member being provided to transport said bottom parts to below said vehicle body to superpose a plurality of fastening portions of said bottom parts onto the to-be-fastened portions of said vehicle body for assembling;
   a transporter for circulating said pallet member, so that the pallet member is stopped below said vehicle body;
   a first feeder disposed in a vicinity of said transporter for feeding said threaded parts to said pallet member;
   a second feeder disposed in a vicinity of said transporter for feeding said bottom parts to said pallet member;
   a lifter disposed below said vehicle body for raising and lowering said pallet member relative to said vehicle body; and
   a plurality of turning machines also disposed below said vehicle body for turning said threaded parts to fasten said bottom parts to said vehicle body, when said pallet member is in a raised position; said pallet member including a plurality of sockets movable toward and away from and turnable relative to said to-be-fastened portions of said vehicle body respectively for holding said threaded parts, each of said turning machines being disposed in a separated relation to said pallet member in association to a corresponding one of said sockets and including a turning shaft for moving each of said sockets toward corresponding one of said to-be-fastened portions while turning, with operational strokes of said individual turning shafts being set uniformly by varying the lengths of the individual sockets.

7. A system for assembling front and rear bottom parts for vehicles, in which the front and rear bottom parts are transported to a position below a vehicle body positioned and fixed and are assembled to the vehicle body, said system comprising:
- a front pallet member for holding said front bottom parts and a plurality of threaded parts for fastening said bottom parts to said vehicle body;
- a front transporter for circulating said front pallet so that said front pallet member is stopped below a front portion of said vehicle body;
- a rear pallet member for holding rear bottom parts and a plurality of threaded parts for fastening said rear bottom parts to said vehicle body;
- a rear transporter for circulating said rear pallet so that said rear pallet member is stopped below a rear portion of said vehicle body;
- a first front feeder disposed in a vicinity of said front transporter to feed said threaded parts to said front pallet member;
- a first rear feeder disposed in a vicinity of said rear transport to feed said threaded parts to said rear pallet member;
- a second front feeder disposed in a vicinity of said front transporter to feed said front bottom parts to said front pallet member;
- a second rear feeder disposed in a vicinity of said rear transporter to feed said rear bottom parts to said rear pallet member;
- a lifter disposed below said vehicle body to raise and lower said front and rear pallet members relative to said vehicle body;
- a front turning machine disposed below said vehicle body for turning said threaded part to fasten said front bottom part to said vehicle body when said front pallet member is in a raised position; and
- a rear turning machine disposed below said vehicle body for turning said threaded part to fasten said rear bottom part to said vehicle body when said rear pallet member is in a raised position.

8. A system for assembling front and rear bottom parts for vehicle according to claim 7, wherein said lifter includes a lift table and a lifting mechanism for lifting said lift table relative to said vehicle body, said lift table including a placing rest disposed thereon, said placing rest including a first placing portion which is located below a front portion of said vehicle body and on which said front pallet member is placed, and a second placing portion which is located below a rear portion of said body and onto which said rear pallet member is placed.

9. A system for assembling bottom parts for vehicles according to claim 8, wherein said placing rest is disposed in a floating state on said lift table, and one of said front and rear pallet members is provided with a plurality of locating pins which are to be fitted into a plurality of locating holes in said vehicle body, respectively, when such pallet member is in the raised position.

10. A system for assembling front and rear bottom parts for vehicles according to claim 8, wherein said lifter further includes a base, said lift table being disposed above said base, and said lifting mechanism having an X-type link interposed between said base and said lift table, said X-type link located on said base being provided at a pivoting point with a detecting mechanism to convert a pivoting angle of the pivoting point into an indication of the height of said lift table.

11. A system for assembling front and rear bottom parts for vehicles according to claim 10, wherein each said pallet member includes a plurality of locating pins which are to be fitted into a plurality of locating holes in said vehicle body, and mating threaded parts for said threaded parts are held on said vehicle body for movement in a horizontal plane.

12. A system for assembling front and rear bottom parts for vehicles according to claim 11, wherein a front placing rest-displacing mechanism is connected to said first placing portion so that the placing rest has a predetermined amount of float and a rear placing rest-displacing mechanism is connected to said second placing portion so that the placing rest has a predetermined amount of float, and wherein said system includes a correcting mechanism to detect a misalignment or misregister of said vehicle body and to operate said front and rear displacing mechanisms when an amount of misalignment exceeds respective predetermined amounts of float.

13. A system for assembling bottom parts for vehicles, according to claim 13, wherein said threaded part is a bolt, and each of said front and rear pallet members includes a plurality of bolt-tightening sockets opened upward so that said bolt with a head top face down may be fed thereinto, wherein each of said first front and rear feeders comprises a transfer mechanism for transferring said bolts one by one with head top faces up, a delivery mechanism movable between a holding position to hold a plurality of the bolts transferred by said transfer mechanism by grasping the bolts one by one and a delivery position to release all the bolts at the same time, and a dispensing mechanism between a receiving position to receive said bolts at the delivery position and a feeding or dispensing position to dispense said bolts to said sockets, said dispensing mechanism including a receiving portion to receive said bolts with head top faces up at the receiving position and then to rotate through 180° to turn said head top faces down.

14. A system for assembling bottom parts for vehicles, comprising:
- front and rear pallet members spaced apart at different distances from portions to be fastened for the vehicle body, said front and rear pallet members for holding thereon front and rear bottom parts and a plurality of threaded parts for fastening said bottom parts to said vehicle body in order to transport said front and rear bottom parts to a position below said vehicle body to superpose a plurality of fastening portions of said bottom parts onto the to-be-fastened portions of said vehicle body for assembling;
- front and rear transporters for circulating said pallet members, so that the pallet members are stopped below said vehicle body;
- first front and rear feeders disposed in a vicinity of said transporters for feeding said threaded parts to said front and rear pallet members;
- second front and rear feeders also disposed in a vicinity of said front and rear transporters for feeding said front and rear bottom parts to said front and rear pallet members;
- lifters disposed below said vehicle body for raising and lowering said front and rear pallet members relative to said vehicle body; and
- a plurality of front and rear turning machines disposed below said vehicle body for turning said threaded parts to fasten said front and rear bottom parts to said vehicle body, when said front and rear pallet members are in a raised position; each of said front and rear pallet members including a plurality of sockets movable toward and away from and turnable relative to said to-be-fastened portions of said vehicle body respectively for holding said threaded parts; each of said turning machines being disposed in a separated relation to said front and rear pallet members in association to a corresponding one of said sockets and including a turning shaft for moving each of said sockets toward corresponding one of said to-be-fastened portions while turning, with operational strokes of said individual turning shafts being set uniformly by varying the lengths of the individual sockets.

* * * * *

UNITED STATES PATENT AND TRADEMARK OFFICE
CERTIFICATE OF CORRECTION

PATENT NO. : 4,893,402

DATED : January 16, 1990

INVENTOR(S) : HIRASAKA et al

It is certified that error appears in the above-identified patent and that said Letters Patent is hereby corrected as shown below:

On the cover page, Item [30], "Oct. 8, 1987" should read

--Aug. 10, 1987--.

Signed and Sealed this

Third Day of September, 1991

Attest:

HARRY F. MANBECK, JR.

Attesting Officer

Commissioner of Patents and Trademarks